United States Patent
Oh et al.

(10) Patent No.: US 11,076,387 B2
(45) Date of Patent: Jul. 27, 2021

(54) METHOD AND DEVICE FOR TRANSMITTING OR RECEIVING CONTROL INFORMATION IN WIRELESS COMMUNICATION SYSTEM

(71) Applicant: Samsung Electronics Co., Ltd., Suwon-si (KR)

(72) Inventors: Jin-Young Oh, Seoul (KR); Seung-Hoon Choi, Seongnam-si (KR); Dong-Han Kim, Osan-si (KR); Young-Bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/773,444

(22) PCT Filed: Nov. 3, 2016

(86) PCT No.: PCT/KR2016/012582
§ 371 (c)(1),
(2) Date: May 3, 2018

(87) PCT Pub. No.: WO2017/078425
PCT Pub. Date: May 11, 2017

(65) Prior Publication Data
US 2018/0332576 A1   Nov. 15, 2018

Related U.S. Application Data

(60) Provisional application No. 62/250,232, filed on Nov. 3, 2015.

(51) Int. Cl.
*H04W 72/04*   (2009.01)
*H04L 1/18*   (2006.01)
(Continued)

(52) U.S. Cl.
CPC ....... *H04W 72/0413* (2013.01); *H04L 1/1671* (2013.01); *H04L 1/1854* (2013.01);
(Continued)

(58) Field of Classification Search
CPC ......... H04W 72/0413; H04W 72/0406; H04W 72/04; H04W 72/00; H04W 72/005;
(Continued)

(56) References Cited

U.S. PATENT DOCUMENTS

| 2011/0249578 A1 | 10/2011 | Nayeb Nazar et al. |
| 2012/0113944 A1 | 5/2012 | Yang et al. |

(Continued)

FOREIGN PATENT DOCUMENTS

| CN | 102123019 A | 7/2011 |
| CN | 102474400 A | 5/2012 |

(Continued)

OTHER PUBLICATIONS

3GPP TSG RAN WG1 Meeting#82bls R1-155540 (Year: 2015).*
(Continued)

*Primary Examiner* — Jeffrey M Rutkowski
*Assistant Examiner* — Sudesh M Patidar
(74) *Attorney, Agent, or Firm* — Jefferson IP Law, LLP

(57) ABSTRACT

A method by which a terminal transmits uplink control information including acknowledgment information in a wireless communication system supporting a carrier aggregation is provided. The method includes receiving, from a base station, downlink control information including indication information of a resource for transmitting the acknowledgment information; when the number of bits of the acknowledgment information is larger than the determined number of bits, determining a specific format of an uplink control channel to which the acknowledgment information will be transmitted; and transmitting the acknowl-
(Continued)

edgment information in the uplink control channel of the specific format using the resource having been indicated on the basis of the indication information.

11 Claims, 13 Drawing Sheets

(51) Int. Cl.
| | |
|---|---|
| *H04L 5/00* | (2006.01) |
| *H04W 74/00* | (2009.01) |
| *H04W 74/08* | (2009.01) |
| *H04L 1/16* | (2006.01) |
| *H04W 16/14* | (2009.01) |

(52) U.S. Cl.
CPC .......... *H04L 1/1861* (2013.01); *H04L 5/0055* (2013.01); *H04W 16/14* (2013.01); *H04W 72/04* (2013.01); *H04W 72/042* (2013.01); *H04W 74/00* (2013.01); *H04W 74/08* (2013.01); *H04W 74/0816* (2013.01); *H04L 5/001* (2013.01)

(58) Field of Classification Search
CPC ... H04W 72/02; H04W 72/042; H04W 74/00; H04W 74/08; H04W 74/0816; H04W 16/14; H04L 1/1854; H04L 1/1671; H04L 1/1861; H04L 5/0055; H04L 5/001
USPC .......................................................... 370/329
See application file for complete search history.

(56) References Cited

U.S. PATENT DOCUMENTS

| | | | |
|---|---|---|---|
| 2013/0044653 A1 | 2/2013 | Yang et al. | |
| 2013/0083741 A1* | 4/2013 | Larsson ................ | H04W 52/48 370/329 |
| 2013/0107852 A1 | 5/2013 | Han et al. | |
| 2013/0223301 A1* | 8/2013 | Lee ..................... | H04W 72/042 370/281 |
| 2013/0301600 A1* | 11/2013 | Park .................... | H04W 72/042 370/329 |
| 2014/0064159 A1 | 3/2014 | Larsson et al. | |
| 2014/0071864 A1* | 3/2014 | Seo ........................ | H04L 5/001 370/294 |
| 2014/0126433 A1* | 5/2014 | Yang .................... | H04L 1/0027 370/280 |
| 2014/0164864 A1* | 6/2014 | Takeda .................. | H04L 1/1854 714/749 |
| 2015/0085815 A1 | 3/2015 | Li et al. | |
| 2016/0157223 A1* | 6/2016 | Nogami ............ | H04W 72/0446 370/329 |
| 2016/0165592 A1* | 6/2016 | Han ...................... | H04L 1/1861 370/280 |
| 2017/0006491 A1* | 1/2017 | Chen .................... | H04B 7/0626 |
| 2018/0249458 A1* | 8/2018 | He ........................ | H04W 72/12 |

FOREIGN PATENT DOCUMENTS

| | | |
|---|---|---|
| CN | 104285399 A | 1/2015 |
| EP | 3 358 897 A1 | 8/2018 |
| KR | 10-2012-0100759 A | 9/2012 |
| KR | 10-2013-0121665 A | 11/2013 |

OTHER PUBLICATIONS

R1-154150, 'Partial subframe for LAA', 3GPP TSG-RAN WG1 #82, Aug. 15, 2015.
Huawei, "Dynamic adaptation of PUCCH formats for HARQ-ACK feedback", 3GPP TSG RAN WG1 Meeting #82Bis, Oct. 5-9, 2015, R1-155093, Malmo, Sweden.
Ericsson, "Periodic CSi feedback enhancement for up to 32 CCs", 3GPP TSG RAN WG1 Meeting #82bis, Oct. 5-9, 2015, R1-155540, Malmo, Sweden.
Ericsson, "PUCCH resource allocation of CA enhancement", 3GPP TSG RAN WG1 Meeting #82bis, Oct. 5-9, 2015, R1-155539, Malmo, Sweden.
European Search Report dated Sep. 27, 2018, issued in European Patent Application No. 16862441.9.
European Office Action dated Aug. 5, 2020, issued in a counterpart European Application No. 16 862 441.9-1205.
R1-110909,ON UCI Transmissoin Under Simultaneous PUCCH and PUSCH, Feb. 15, 2011.
European Office Action dated Oct. 20, 2020, issued in a counterpart European Application No. 16 862 441.9.
Intel Corporation; Remaining details of Multi-cell HARQ-ACK and Periodic CSI; 3GPP TSG-RAN WG1 Meeting #70bis; R1-124110; Sep. 29, 2012, San Diego, USA.
"10 Physical uplink control channel procedures", 3GPP Draft; R1-144235—Draft 36.213 REL-12 LTE-ADV Feature—D2D, DC, NAICS,SCE (SC 10 Only), 3rd Generation Partnership Project (3GPP), XP050885131, Retrieved from the Internet: URL:http://www.3gpp.org/ftp/tsg_ran/WG1_RL1/TSGR1_78b/Docs/ Oct. 9, 2014.
Chinese Office Action dated Feb. 4, 2021, issued in a counterpart Chinese Application No. 201680074496.4.

\* cited by examiner

METHOD AND DEVICE FOR TRANSMITTING OR RECEIVING CONTROL INFORMATION IN WIRELESS COMMUNICATION SYSTEM

CROSS-REFERENCE TO RELATED APPLICATION(S)

This application is a U.S. National Stage application under 35 U.S.C. § 371 of an International application number PCT/KR2016/012582, filed on Nov. 3, 2016, which is based on and claimed priority of a U.S. Provisional application Ser. No. 62/250,232, filed on Nov. 3, 2015, in the U.S. Patent and Trademark Office, the disclosure of which is incorporated by reference herein in its entirety.

TECHNICAL FIELD

The present disclosure relates to a method and device for transmitting control information in a wireless communication system and, more particularly, to a method and device for, when a plurality of cells exist in a wireless communication system, transmitting, from a terminal to a base station, ACK/NACK feedback on data and channel information about at least one serving cell, and a method and device for transmitting control information in an unlicensed band.

BACKGROUND ART

In order to meet wireless data traffic demands that have increased after $4^{th}$ generation (4G) communication system commercialization, efforts to develop an improved $5^{th}$ generation (5G) communication system or a pre-5G communication system have been made. For this reason, a 5G communication system or a pre-5G communication system has been referred to as a beyond 4G network communication system or a post long term evolution (LTE) communication system.

In order to achieve a high data transmission rate, an implementation of the 5G communication system in an ultrahigh frequency (mmWave) band (for example, 60 GHz band) is being considered. In the 5G communication system, technologies such as beamforming, massive multi-input multi-output (MIMO), Full Dimensional MIMO (FD-MIMO), an array antenna, analog beam-forming, and a large scale antenna are discussed to mitigate a propagation path loss in the mmWave band and increase a propagation transmission distance.

Further, technologies such as an evolved small cell, an advanced small cell, a cloud radio access network (cloud RAN), an ultra-dense network, device to device communication (D2D), a wireless backhaul, a wireless network (moving network), cooperative communication, coordinated multi-points (CoMP), and reception interference cancellation (interference cancellation) have been developed to improve the system network in the 5G communication system.

In addition, the 5G system has developed advanced coding modulation (ACM) schemes such as hybrid frequency shift keying (FSK) and quadrature amplitude modulation (QAM) modulation (FQAM) and sliding window superposition coding (SWSC), and advanced access technologies such as filter bank multi carrier (FBMC), non-orthogonal multiple access (NOMA), and sparse code multiple access (SCMA).

Meanwhile, the Internet has been evolved to an internet of things (IoT) network in which distributed components such as objects exchange and process information from a human-oriented connection network in which humans generate and consume information. Internet of everything (IoE) technology may be an example of a combination of the IoT technology and big data processing technology through a connection with a cloud server.

In order to implement the IoT, technical factors such as a sensing technique, wired/wireless communication and network infrastructure, service interface technology, and security technology are required. Accordingly, recent research is being conducted on technologies such as a sensor network, machine to machine (M2M), machine type communication (MTC), and the like for a connection between objects.

In an IoT environment, through collection and analysis of data generated in connected objects, an intelligent internet technology (IT) service to create new value for people's lives may be provided. The IoT may be applied to fields, such as a smart home, smart building, smart city, smart car, connected car, smart grid, health care, smart home appliance, or high-tech medical service, through the convergence and combination of the conventional IT and various industries.

Accordingly, various attempts to apply the 5G communication system to the IoT network are made. For example, a 5G communication technology such as a sensor network, machine to machine, MTC, etc. is implemented by a scheme such as beamforming, MIMO, and an array antenna, etc. The application of a cloud RAN as the big data processing technology as described above may be an example of convergence of the 5G technology and the IoT technology.

The above wireless communication system has been developed to provide voice services while ensuring the mobility of users. However, the wireless communication system has gradually expanded its service scope from voice to data services. In recent years, the wireless communication system has evolved to a degree that it can provide high-speed data services. However, currently, the wireless communication system that provides services suffers from a lack of resources, and users require the wireless communication system to provide higher-speed services to them. Accordingly, there is a necessity for more advanced wireless communication systems.

Responding to these needs, a 3rd Generation Partnership Project (3GPP) is working on standardization of a long term evolution (LTE) system. LTE is a technology of implementing high speed packet-based communication having a transmission speed of 100 Mbps or more. To this end, several methods are discussed, including a method of reducing the number of nodes located on a communication channel by simplifying a network architecture, a method of making wireless protocols closest to a wireless channel, and the like.

An LTE system adopts a hybrid automatic repeat request (HARQ) scheme of retransmitting corresponding data in a physical layer when decoding failure occurs at initial transmission. A HARQ scheme allows a receiver to transmit information (negative acknowledgement, NACK) notifying of decoding failure to a transmitter and the transmitter to retransmit corresponding data in a physical layer when the receiver fails to accurately decode the data. The receiver combines the data retransmitted by the transmitter and the existing decoding-failed data to enhance data reception performance. In addition, when the receiver accurately decodes data, the receiver transmits acknowledgement information (acknowledgement, ACK) notifying of decoding success to the transmitter to allow the transmitter to transmit new data.

FIG. 1 is a diagram illustrating an example of a basic structure of a time-frequency domain, which is a wireless resource region in which data or a control channel is transmitted in a downlink of an LTE system.

In FIG. 1, a transverse axis shows a time domain, and a vertical axis shows a frequency domain. In the time domain, a minimum transmission unit is an OFDM symbol. $N_{symb}$ number of OFDM symbols 102 constitutes one slot 106, and two slots constitute one subframe 105. The length of the slot is 0.5 ms, and the length of the subframe is 1.0 ms. A wireless frame 114 is a unit of the time domain and includes ten subframes. In the frequency domain, a minimum transmission unit is a subcarrier, and a total of $N_{BW}$ number of subcarriers 104 are included in the bandwidth of an entire system transmission band.

In a time-frequency domain, a basic unit of a resource is a resource element (RE) 112 and may be expressed by an OFDM symbol index and a subcarrier index. A resource block (RB, or Physical Resource Block, PRB) 108 is defined by $N_{symb}$ number of consecutive OFDM symbols 102 in the time domain and NR number of consecutive subcarriers 110 in the frequency domain. Therefore, one RB 108 includes $N_{symb} \times N_{RB}$ number of REs 112. Generally, a minimum transmission unit of data is the unit of the RB. In an LTE system, in general, $N_{symb}$ is 7, $N_{RB}$ is 12, and $N_{BW}$ and $N_{RB}$ are proportional to the bandwidth of a system transmission band. A data rate increases in proportion to the number of RBs scheduled to a terminal. An LTE system may define and operate six transmission bandwidths. In a frequency division duplexing (FDD) system operating a downlink and an uplink while discriminating them by frequency, a downlink transmission bandwidth and an uplink transmission bandwidth may be different from each other. A channel bandwidth indicates an RF bandwidth corresponding to a system transmission bandwidth. <Table 1> below illustrates one example of a corresponding relation between a channel bandwidth and a system transmission bandwidth defined in an LTE system. For example, in an LTE system having a channel bandwidth of 10 MHz, a transmission bandwidth may include 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Downlink control information is transmitted within N number of initial OFDM symbols in the subframe. Generally, N is {1, 2, 3}. Therefore, the value of N changes for each subframe depending on the amount of control information that should be transmitted to a current subframe. The control information may include a control channel transmission interval indicator indicating through which number of OFDM symbols the control information is transmitted, scheduling information of downlink data or uplink data, a HARQ ACK/NACK signal, etc.

In an LTE system, scheduling information of downlink data or uplink data may be transferred through downlink control information (DCI) from a base station to a terminal. An uplink (UL) means a wireless link through which a terminal transmits data or control information to a base station, and a downlink (DL) means a wireless link through which a base station transmits data or control information to a terminal. In an LTE system, the DCI is defined by various formats. A determined DCI format may be applied and operated depending on whether the DCI corresponds to scheduling information (UL grant) of uplink data or scheduling information (DL grant) of downlink data, whether the DCI corresponds to compact DCI including a small size of control information, whether the DCI applies spatial multiplexing using multiple antennas, whether the DCI corresponds to DCI for controlling electric power, etc. For example, DCI format 1 used as scheduling control information (DL grant) of downlink data may include at least control information as below.

Resource allocation type 0/1 flag: Send notification of whether a resource allocation scheme corresponds to type 0 or type 1. The type 0 applies a bitmap scheme to allocate a resource in units of resource block groups (RBGs). In an LTE system, a basic unit of scheduling corresponds to a resource block (RB) expressed by a time and frequency domain resource, and an RBG includes a plurality of RBs and is a basic unit of scheduling in the type 0 scheme. The type 1 allows a particular RB to be allocated within an RBG.

Resource block assignment: Send notification of an RB allocated for transmitting data. A resource is determined according to a system bandwidth and a resource allocation scheme.

Modulation and coding scheme (MCS): Send notification of a modulation scheme used for transmitting data and the size of a transport block which is data to be transmitted.

HARQ process number: Send notification of a HARQ process number.

New data indicator: Send notification of whether transmission corresponds to HARQ initial transmission or retransmission.

Redundancy version: Send notification of a redundancy version of a HARQ.

Transmit power control (TPC) command for physical uplink control channel (PUCCH): Send notification of a transmit power control command for a PUCCH, which is an uplink control channel.

The DCI is transmitted through a physical downlink control channel (PDCCH) or an enhanced PDCCH (EPDCCH), which is a downlink physical control channel, after the DCI has gone through a channel coding and modulation process.

Generally, the DCI is independently channel-coded for each terminal and then configured by independent PDCCHs, and the independent PDCCHs are transmitted. In the time domain, a PDCCH is mapped and then the mapped PDCCH is transmitted during the control channel transmission interval. A location at which a PDCCH is mapped in the frequency domain may be determined by an identifier (ID) for each terminal and positioned in the entire system transmission band.

Downlink data is transmitted through a physical downlink shared channel (PDSCH), which is a physical channel for transmitting downlink data. A PDSCH is transmitted after the control channel transmission interval, and scheduling information such as a specific mapping location in the frequency domain, a modulation scheme, etc. is notified by DCI transmitted through the PDCCH.

Through MCS including 5 bits among pieces of control information included in the DCI, a base station notifies a terminal of a modulation scheme applied to a PDSCH, and the size (transport block size, TBS) of data, the PDSCH and data to be transmitted by the base station to the terminal. The TBS corresponds to a size before channel coding for correcting error is applied to the data (transport block, TB) to be transmitted by the base station.

A modulation scheme supported by an LTE system includes, for example, quadrature phase shift keying (QPSK), 16 quadrature amplitude modulation (QAM), 64QAM, etc., and modulation orders ($Q_m$) thereof corresponds to 2, 4, and 6, respectively. That is, QPSK modulation can transmit two bits per symbol, 16 QAM can transmit four bits per symbol, and 64 QAM can transmit six bits per symbol.

3GPP LTE Rel-10 adopts a bandwidth extension technology to support a data transmission amount higher than that of LTE Rel-8. Through the technology, which is called bandwidth extension or carrier aggregation (CA), a band is extended, and a data transmission amount can be increased by an amount of the extended band compared to an LTE Rel-8 terminal that transmits data within one band. Each of the bands is called a component carrier (CC), and an LTE Rel-8 terminal is regulated to have one component carrier for each of a downlink and an uplink. Also, a group of a downlink component carrier and an uplink component carrier that is connected to the downlink component carrier by a system information block (SIB)-2 is called a cell. An SIB-2 connection relation between a downlink component carrier and an uplink component carrier may be transmitted by a system signal or a higher (layer) signal. A terminal supporting CA may receive downlink data and transmit uplink data through a plurality of serving cells.

In Rel-10, a carrier indicator field (CIF) may be configured as a field notifying that, when a base station is in a situation of having difficulty in transmitting a physical downlink control channel (PDCCH) in a particular serving cell to a particular terminal, the base station transmits the PDCCH in another serving cell, and the corresponding PDCCH indicates a physical downlink shared channel (PDSCH) or a physical uplink shared channel (PUSCH) of the another serving cell. The CIF may be configured for a terminal supporting CA. A CIF may indicate a different serving cell by adding three bits to PDCCH information in a particular serving cell. A CIF is included only when cross carrier scheduling is performed, and when a CIF is not included, cross carrier scheduling may not be performed. The CIF is defined to, when the CIF is included in downlink assignment information (DL assignment), indicate a serving cell in which a PDSCH scheduled by the DL assignment is to be transmitted, and, when the CIF is included in uplink resource assignment information (UL grant), indicate a serving cell in which a PUSCH scheduled by the UL grant is to be transmitted.

As described above, in LTE-10, carrier aggregation (CA), which is a bandwidth extension technology, is defined, so that a plurality of serving cells may be configured for a terminal. Then, the terminal periodically or aperiodically transmits channel information about the plurality of serving cells to a base station to allow data scheduling of the base station. The base station schedules data for each carrier and transmits the scheduled data, and the terminal transmits ACK/NACK (A/N) feedback on the data transmitted for each carrier. LTE Rel-10 is designed to transmit a maximum of 21 bits of A/N feedback, and when A/N feedback and transmission of channel information overlap to each other in one subframe, transmit the A/N feedback and throw out the channel information. LTE Rel-11 is designed to multiplex A/N feedback and channel information of one cell together to allow a maximum of 22 bits of A/N feedback and channel information of one cell to be transmitted in a transmission resource of a PUCCH format 3.

Meanwhile, in LTE-13, a scenario of configuring a maximum of 32 serving cells is assumed, and a concept of enlarging the number of serving cells up to a maximum of 32 by using a band in an unlicensed band has been discussed. In this case, there is a concern that transmissions of pieces of channel information for the plurality of serving cells in one subframe may collide with each other.

DETAILED DESCRIPTION OF THE INVENTION

Technical Problem

Therefore, a new PUCCH format allowing transmission of multiple pieces of channel information or multiple A/N feedbacks in one step is required to be designed. In addition, a method of supporting terminal operation when A/N feedback or channel information about as many serving cells as possible are multiplexed in one subframe is required. A method of determining a transmission resource in consideration of the number of transmission bits of A/N feedback or channel information that a terminal should transmit, and transmitting the channel information and A/N feedbacks, individually or in combination, by using a transmission format mapped to the transmission resource is required.

The present disclosure provides a method and device for efficiently transmitting and receiving control information about a plurality of serving cells without wasting a transmission resource of a downlink control channel in a wireless communication system.

In addition, the present disclosure provides a method and device for efficiently transmitting and receiving channel information or A/N feedback, independently or in combination, in a wireless communication system supporting CA.

In addition, the present disclosure provides a method and device for efficiently transmitting and receiving control information in an unlicensed band of a wireless communication system.

In addition, the present disclosure provides a method and device for detecting a channel in an unlicensed band in a wireless communication system.

In addition, the present disclosure provides a method and device for configuring a time point at which a channel detecting operation in an unlicensed band is performed in a wireless communication system, and performing the channel detecting operation according to the configured time point.

Technical Solution

A method for transmitting, by a terminal, uplink control information including acknowledgment information in a wireless communication system supporting carrier aggregation according to an embodiment of the present disclosure includes: receiving, from a base station, downlink control information including indication information of a resource for transmitting the acknowledgment information; when the number of bits of the acknowledgment information is larger than a determined number of bits, determining a specific format of an uplink control channel in which the acknowledgment information is to be transmitted; and transmitting the acknowledgment information in the uplink control channel of the specific format using the resource having been indicated on the basis of the indication information.

In addition, a terminal in a wireless communication system supporting carrier aggregation according to an embodiment of the present disclosure includes: a transmitter/receiver configured to transmit/receive data; and a controller configured to control to receive, from a base station, downlink control information including indication information of a resource for transmitting acknowledgment information, when the number of bits of the acknowledgment information is larger than a determined number of bits, determine a specific format of an uplink control channel in which the acknowledgment information is to be transmitted, and transmit the acknowledgment information in the uplink control channel of the specific format using the resource having been indicated on the basis of the indication information.

In addition, a method for transmitting control information in a wireless communication system supporting communication in an unlicensed band according to an embodiment of the present disclosure includes: detecting a channel for communication in the unlicensed band; when the detected channel is in an idle state, occupying the channel; and transmitting, to a terminal, control information including configuration information of a subframe applied to a channel occupancy interval in the unlicensed band, wherein at least one subframe among a plurality of subframes transmitted in the channel occupancy interval includes control information representing a partial subframe in which some symbols are used in the unlicensed band.

In addition, a base station in a wireless communication system supporting communication in an unlicensed band according to an embodiment of the present disclosure includes: a transmitter/receiver configured to transmit and receive data; and a controller configured to control to detect a channel for communication in the unlicensed band, when the detected channel is in an idle state, occupy the channel, and transmit, to a terminal, control information including configuration information of a subframe applied to a channel occupancy interval in the unlicensed band, wherein at least one subframe among a plurality of subframes transmitted in the channel occupancy interval includes control information representing a partial subframe in which some symbols are used in the unlicensed band.

In addition, a terminal in a wireless communication system supporting communication in an unlicensed band according to an embodiment of the present disclosure includes: a transmitter/receiver configured to transmit and receive data; and a controller configured to control to determine whether a channel for communication in the unlicensed band is occupied, and when the channel is occupied, receive, from a base station, control information including configuration information of a subframe applied to a channel occupancy interval in the unlicensed band, wherein at least one subframe among a plurality of subframes transmitted in the channel occupancy interval includes control information representing a partial subframe in which some symbols are used in the unlicensed band.

In addition, a method for detecting a channel by a base station in a wireless communication system according to an embodiment of the present disclosure includes: configuring a channel detecting interval for detecting a channel usable in an unlicensed band; configuring a second start time point at which a channel detecting operation starts, on the basis of the configured channel detecting interval and a first start time point at which the base station starts transmitting a signal; and performing the channel detecting operation during the channel detecting interval from the configured second start time point.

In addition, a method for detecting a channel by a terminal in a wireless communication system according to an embodiment of the present disclosure includes: receiving, from a base station, information for configuring a channel detecting interval for detecting a channel usable in an unlicensed band; configuring the channel detecting interval on the basis of the received information; configuring a second start time point at which a channel detecting operation starts, on the basis of the pre-configured channel detecting interval and a first start time point at which the terminal starts transmitting a signal; and performing the channel detecting operation during the channel detecting interval from the configured second start time point.

In addition, a base station in a wireless communication system according to an embodiment of the present disclosure includes: a controller configured to configure a channel detecting interval for detecting a channel usable in an unlicensed band, configure a second start time point at which a channel detecting operation starts, on the basis of the configured channel detecting interval and a first start time point at which the base station starts transmitting a signal, and control the channel detecting operation during the channel detecting interval from the configured second start time point; and a transmitter configured to transmit a signal through the detected channel.

In addition, a terminal in a wireless communication system according to an embodiment of the present disclosure includes: a receiver configured to receive data; and a controller configured to receive, from a base station, information for configuring a channel detecting interval for detecting a channel usable in an unlicensed band, configure the channel detecting interval on the basis of the received information, configure a second start time point at which a channel detecting operation starts, on the basis of the configured channel detecting interval and a first start time point at which the terminal starts transmitting a signal, and control the channel detecting operation during the channel detecting interval from the configured second start time point.

The present disclosure as described above may provide a terminal transmission method and device required when A/N feedback or channel information of a terminal is transmitted in a wireless communication system in which a plurality of cells are aggregated. In response to this, a base station receives A/N feedback or channel information about a plurality of serving cells from a terminal and performs optimal scheduling on the serving cells to improve a transmission amount.

Also, according to the present disclosure as described above, a channel detecting operation for using an unlicensed band in a wireless communication system is more efficiently performed, and a standard for a channel detecting operation is clearly configured. Therefore, channel detecting operation performance in an unlicensed band can be increased. Meanwhile, various effects in addition to the above effect will be directly or implicitly disclosed in the detained description according to the after-mentioned embodiments of the present disclosure.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
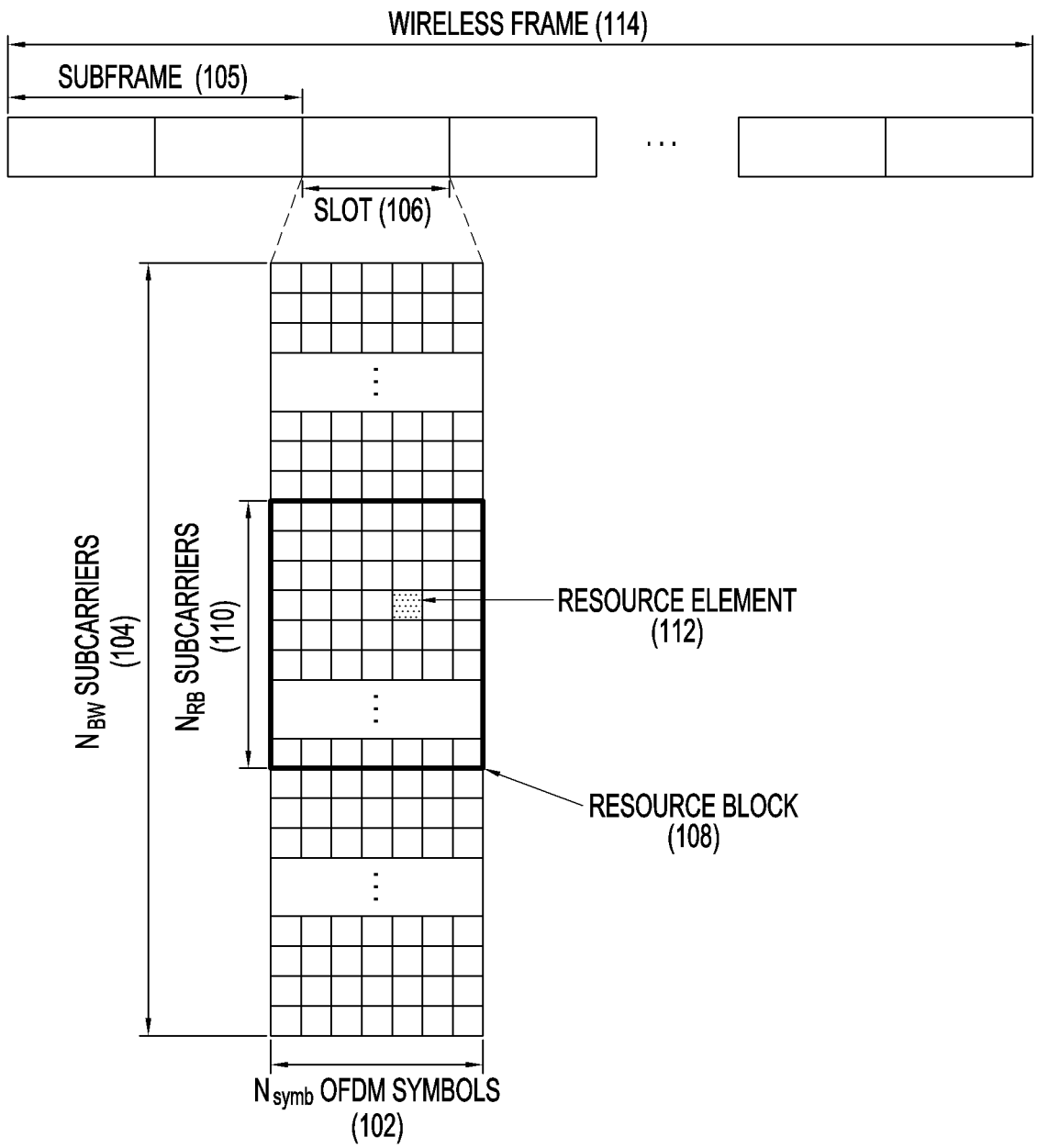
FIG. 1 is a diagram illustrating an example of a basic structure of a time-frequency domain, which is a wireless resource region in which data or a control channel is transmitted in a downlink of an LTE system.

Hereinafter, exemplary embodiments of the present disclosure will be described in detail with reference to the accompanying drawings. Here, it is noted that identical reference numerals denote the same elements in the accompanying drawings where possible. Further, a detailed description of a known function and configuration which may make the subject matter of the present disclosure unclear will be omitted.

Other aspects, gains, and core features of the present disclosure are processed along with additional drawings, and they are apparent to those skilled in the art from the following detailed description including exemplary embodiments of the present disclosure.

Before the following detailed description of the present disclosure, it may be efficient to configure definitions of particular words and phrases used throughout the present patent document. The terms "include", "comprise", and derivatives thereof may mean inclusion without limitation, the term "or" may have an inclusive meaning and means "and/or", the phrases "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of, the term "controller" may mean any device, system, or a part thereof that controls at least one operation, and such a device may be implemented in hardware, firmware, or software, or some combinations of at least two of the same. It should be noted that the functionality associated with any particular controller may be centralized or distributed, whether locally or remotely. Definitions for certain words and phrases are provided throughout this patent document, those skilled in the art should understand that in many, if not most instances, such definitions apply to prior, as well as future uses of such defined words and phrases.

In addition, the following embodiments of the present disclosure will be explained taking an example of an advanced evolved-universal terrestrial radio access (E-UTRA, or referred to as LTE-A) system supporting carrier aggregation. However, it should be noted that the present disclosure is not limited to an LTE-A system. The embodiments of the present disclosure can be applied to other communication systems having a similar technical background and channel type through slight modification without departing from the scope of the present disclosure, and a person skilled in the art of the present disclosure can determine the application. For example, the present disclosure can be applied to multicarrier high speed packet access (HSPA) supporting carrier aggregation.

Considering that the number of licensed bands such as a band of an LTE (as long as there is no other description in the present disclosure, advanced LTE technologies including LTE-A are called LTE) frequency is limited, it has been researched that an LTE service can be provided in an unlicensed band such as a 5 GHz band, and that is called licensed assisted access (LAA). It has been considered that when the LAA is introduced, a carrier aggregation technology of LTE-A is applied to operate an LTE cell corresponding to a licensed band, as a primary (P) cell, and an LAA cell corresponding to an unlicensed band, as a secondary (S) cell. Therefore, like in LTE-A, feedback of a terminal generated in an LAA cell, which is an S cell, should be transmitted by only a P cell, and a FDD or time division duplex (TDD) structure can be applied to the LAA cell. Hereinafter, a wireless communication system in which the LTE cell and LAA cell coexist and which supports carrier aggregation will be described.

Figure 2A:
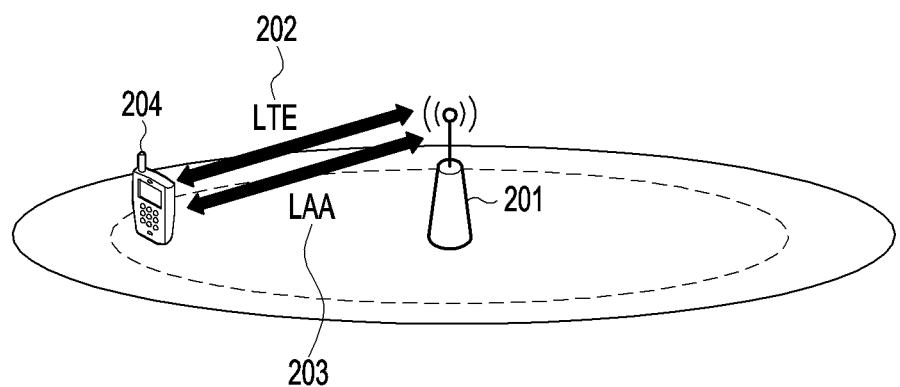
FIGS. 2A and 2B are diagrams illustrating one example of a wireless communication system to which an embodiment of the present disclosure is applied.
Figure 2B:
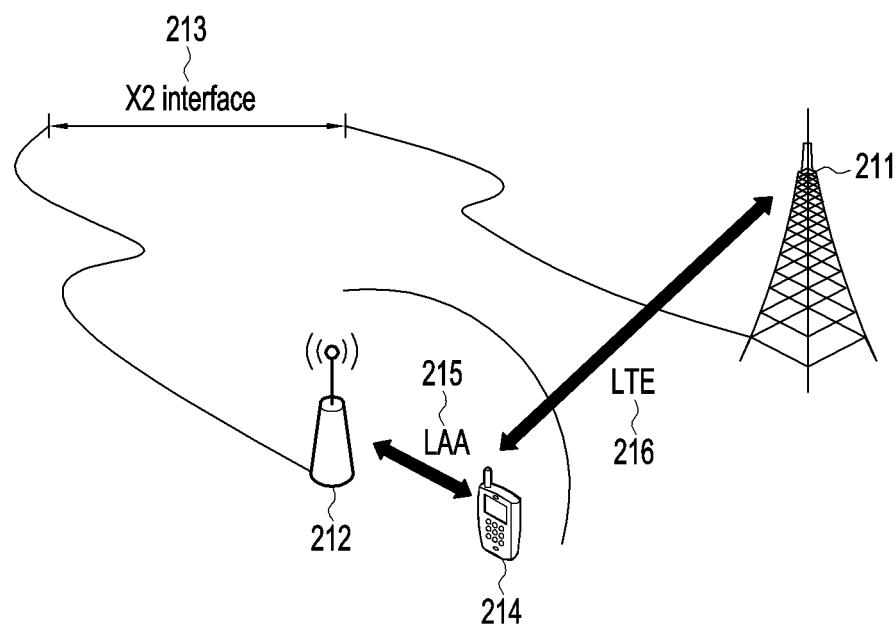

FIGS. 2A and 2B are diagrams illustrating one example of a wireless communication system to which an embodiment of the present disclosure is applied.

Referring to FIGS. 2A and 2B, FIG. 2A illustrates coexistence between an LTE cell 202 and an LAA cell 203 within the coverage of one small base station 201 in a network, and a terminal 204 transmits and receives data through the LTE cell 202 and the LAA cell 203 to and from the base station 201. A duplex scheme of the LTE cell 202 or LAA cell 203 has no limitation. However, uplink transmission may be possible only through the LTE cell 202 when the LTE cell 202 is a P cell.

FIG. 2B illustrates a network in which an LTE macro base station (hereinafter, LTE base station) 211 for wide coverage and an LAA cell 215 of an LAA small base station 212 for increasing a data transmission amount for a terminal 214 are installed. In this case, there is no limitation on a duplex scheme of the LTE macro base station 211 or the LAA small base station (hereinafter, LAA base station) 212. However, uplink transmission of a case where the LTE base station is a P cell is possible only through the LTE base station 211. The LTE base station 211 and the LAA base station 212 are assumed to have an ideal backhaul network. Therefore, communication using an X2 interface 213 is possible between the base stations. Therefore, even when an uplink is transmitted only to the LTE base station 211, the LAA base station 212 can receive related control information through the X2 interface 213 from the LTE base station 211 in real time. The systems illustrated in FIGS. 2A and 2B may support a plurality of serving cells including an LTE cell and an LAA cell. For example, 32 (or more) serving cells may be supported thereby. Therefore, methods proposed in the embodiments of the present disclosure can be applied to both the systems of FIGS. 2A and 2B.

Meanwhile, in LTE Rel-12, for example, a maximum of 5 serving cells may be configured for a terminal by CA, which is a bandwidth extension technology. The terminal may be configured by higher (layer) information such that the terminal periodically transmits channel (state) information to allow the base station to perform data scheduling.

In the following embodiments of the present disclosure, an operation of periodically transmitting channel information is called periodic channel information transmission, and periodic channel information may be transmitted through a physical uplink control channel (PUCCH) of a primary serving cell (Pcell). In addition, for a terminal for which CA is configured, a periodic channel information transmission operation may be independently defined for each serving cell. The types of pieces of information that should be transmitted by a periodic channel information transmission operation may correspond to a subband (or narrowband) CQI, a subband CQI and second PMI, a wideband (or broadband) CQI and precoding matrix indicator (PMI), a wideband first PMI, a wideband CQI and second PMI, a wideband CQI and first PMI and second PMI, a rank indicator (RI), a wideband CQI, an RI and first PMI, an RI and precoder type indicator (PTI), etc.

Pieces of information that should be transmitted by a terminal may be determined among the exemplified pieces of information depending on a transmission mode according to higher (layer) information, and pieces of transmission information may be configured to have respective frequencies and offsets depending on higher (layer) information It may be designed that when time points of periodic channel information transmissions for a plurality of serving cells in one subframe match with each other during a periodic channel information transmission operation, periodic channel information for only one serving cell in one subframe is transmitted in a PUCCH of a Pcell. In addition, even in one serving cell, when transmission time points of multiple pieces of channel information match with each other in one subframe, only one piece of channel information can be transmitted. In this case, priorities of information are determined by using a serving cell index and the type of information that should be transmitted among pieces of periodic channel information configured to be transmitted for a plurality of serving cells. Accordingly, only periodic channel information for one serving cell is transmitted, and periodic channel information for the remaining serving cell(s) is thrown away. Next, priorities for channel information transmission will be described.

For example, when transmission time points of multiple pieces of channel information for one serving cell match with each other, transmission of information including a rank indication (RI) has a top priority. When transmission time points of pieces of channel information for a plurality of serving cells match with each other, information including RI or a first precoding matrix indicator (PMI) has first priority, and information including a wideband channel quality indicator (CQI) has second priority. In addition, when pieces of channel information having the same priority are transmitted for different serving cells, information having a low serving cell index has priority. In reality, in Rel-10, a two-serving cells configuration scenario is assumed. Therefore, collisions of periodic channel information transmissions for a plurality of serving cells as described above occur few times, and a base station configures different periodic channel information transmission periods and offsets for respective serving cells to easily avoid collision.

However, when a scenario relating to configuration of a maximum of 32 serving cells is assumed like Rel-13, it is difficult to avoid transmission collision of periodic channel information in a plurality of serving cell with only a base station configuring different periodic channel information transmission periods and offsets for the serving cells. Therefore, a probability that channel information transmission time points in one subframe match with each other increases rapidly in comparison with that of Rel-12. In addition, when a terminal transmits one piece of periodic channel information in only one serving cell and throws away periodic channel information for the remaining serving cell(s) as defined in Rel-12, a base station has difficulty in performing optimal scheduling on the remaining serving cell(s), thereby negatively influencing a transmission amount of data transmitted to the terminal.

When the base station transmits UL grant including an aperiodic channel information request to transmit pieces of channel information for the plurality of serving cells, the base station should transmit UL grant at every time when periodic channel information transmission time points in one serving cell or a plurality of serving cells match with each other. Therefore, a PDCCH transmission resource is wasted, so that a PDCCH resource for scheduling the other terminals in the base station is reduced. Therefore, when Rel-13 supports configuration of, for example, a maximum of 32 serving cells for CA, a method of supporting a periodic channel information transmission operation for as many serving cells as possible in one subframe without requiring a PDCCH transmission resource is required.

Therefore, in Rel-13, a new PUCCH format (hereinafter, the new PUCCH format is referred to as a PUCCH format X in an embodiment of the present disclosure, and in addition, the PUCCH format X may indicate two or more different PUCCH formats) by which a payload size of 22 bits or more can be transmitted is defined. The PUCCH format X may be used for performing A/N (feedback) transmission on downlink data scheduled in multiple cells, multiplexing pieces of channel information of multiple cells and transmitting the multiplexed pieces of information, and when transmissions of A/N and channel information overlap with each other in one subframe, simultaneously transmitting the A/N and the channel information.

In the embodiments of the present disclosure described below, a method for transmitting, by a terminal, A/N feedback or channel information about a plurality of serving cells in a wireless communication system supporting CA will be described.

First, a method for transmitting, by a terminal, A/N according to embodiments of the present disclosure will be described.

When a terminal is configured to use the PUCCH format X by a base station, or for example, five or more cells are configured thereto by the base station, the terminal may use the PUCCH format X to transmit A/N for data transmitted in each carrier. Information about resources for transmitting the PUCCH format X may be configured by higher (layer) information and then transmitted to the terminal, and the terminal may recognize which resource the terminal should use to transmit the A/N through an A/N resource indicator included in a DCI format. When the number of A/Ns that should be transmitted in one subframe does not exceed 22 bits in an embodiment of the present disclosure, the terminal may use a PUCCH format 3 to perform A/N transmission.

Information about transmission resources of the PUCCH format 3 may be configured by higher (layer) information and then transmitted to the terminal, and the terminal may recognize which resource the terminal should use to transmit the A/N through an A/N resource indicator included in a DCI format. All transmission resources of a PUCCH format X and a PUCCH format 3 may be indicated through an A/N resource indicator by a base station. However, a terminal according to an embodiment of the present disclosure may determine whether a resource indicated through an A/N resource indicator depending on an A/N payload size that should be transmitted in one subframe is for a PUCCH format 3 or a PUCCH format X. When the number of A/Ns that should be transmitted in one subframe is 1 or 2 bits, that is, data is scheduled only in one subframe of a P cell, a terminal maps the A/N to a PUCCH format 1a/1b and transmits the mapped A/N, and a transmission resource is mapped to an index of a resource in which a DCI format is transmitted. The higher layer information will be simply referred to as higher information. The higher layer information may be transmitted through, for example, radio resource control (RRC) signaling, an SIB, etc.

Next, a method for transmitting, by a terminal, pieces of channel information of a plurality of cells will be described according to the present disclosure.

When use of the PUCCH format X (multiple PUCCH formats may be configured for the terminal, and when the number of PUCCH formats is two, the PUCCH format X indicates a PUCCH format A or a PUCCH format B) or a transmission resource of the PUCCH format X is configured by a base station in order to allow the terminal to transmit channel information of a plurality of cells or multiple pieces of channel information (the multiple pieces of channel information may be configured to be transmitted for multiple cells or one cell), a terminal may use the PUCCH format X to transmit multiple pieces of channel information configured for each carrier. A maximum payload size or a code rate of pieces of channel information that a terminal should transmit in one subframe may be determined by higher information. At least two different resources for transmitting the pieces of channel information is configured by higher information and then transmitted to the terminal, and the terminal may determine which resource the terminal selects among the resources and transmits the multiple pieces of channel information.

An example of methods for transmitting the multiple pieces of channel information is as below.

In a first method, a terminal may determine the transmission resource according to the entire payload size of pieces of channel information overlapping in one subframe. For example, when transmissions of only two pieces of channel information overlap in one subframe, a terminal may determine to use a transmission resource of a PUCCH format 3 and may transmit the two pieces of channel information through the PUCCH format 3. In addition, when transmissions of 2 to y (wherein, y>2) pieces of channel information overlap in one subframe, a terminal may transmit the pieces of channel information on a transmission resource configured for a PUCCH format B, through the PUCCH format B. In addition, when transmissions of y or more pieces of channel information overlap in one subframe, a terminal may transmit the pieces of channel information on a transmission resource configured for a PUCCH format A, through the PUCCH format A.

In a second method, when the number of pieces of channel information, transmissions of which overlap in one subframe, exceeds two, a PUCCH format A or a PUCCH format B may be used, and a PUCCH format that the terminal is to actually use is determined depending on a transmission power of channel information that should be transmitted. For example, a terminal may determine a PUCCH format having a low transmission power, and a base station should decode two PUCCH formats.

In a third method, a base station pre-determines a PUCCH format to be used by a terminal, by means of higher information, and then transmits the higher information to the terminal. Therefore, when at least two or more pieces of channel information overlap in one subframe, a terminal may previously recognize which PUCCH format and transmission resource a terminal should use, and a base station may reduce decoding complexity.

Next, a method for transmitting, by a terminal, A/N feedback on data transmission and channel information of multiple cells together according to the present disclosure will be described.

The terminal transmission operation is performed in a case where a terminal is configured to transmit A/N feedback and channel information together by means of higher information. When the operation is disabled by the higher information, a terminal operation in a case where there is only A/N transmission is performed.

A maximum payload size or a code rate of pieces of channel information that a terminal should transmit in one subframe in order to transmit channel information of a plurality of cells or multiple pieces of channel information (the multiple pieces of channel information may be configured to be transmitted for multiple cells or one cell) may be configured by means of higher information by a base station. In addition, a maximum payload size which a terminal can transmit in one subframe in order to transmit A/N on downlink data transmitted in multiple cells may be configured by means of higher information by a base station, or may be previously determined. A maximum payload size for a terminal to use during simultaneous transmissions of A/N and channel information may be determined depending on the maximum payload size of a transmission PUCCH format to which a transmission resource has been mapped. For example, when a transmission resource configured for transmitting channel information is selected to transmit the A/N and channel information by a terminal, the terminal may determine a maximum payload size using a code rate or a maximum payload size configured for transmitting channel information. In addition, when a transmission resource indicated by an A/N resource indicator configured for transmitting A/N is selected by a terminal so as to transmit the A/N and channel information, the terminal may determine a maximum payload size using a maximum payload size configured for transmitting A/N.

Next, a method for when a terminal transmits A/N feedback on data transmission and channel information of multiple cells together according to an embodiment of the present disclosure, determining a PUCCH format and a transmission resource will be described.

For convenience of explanation, with reference to <Table 2> to <Table 4>, a case where pieces of channel information of which transmissions overlap in one subframe have a size smaller than 12 bits, and a case where the pieces of channel information have a size exceeding 11 bits are separately explained. Further, a method for transmitting A/N feedback and channel information together will be described for a case where pieces of A/N information, transmission of which overlap in one subframe, have a size of one or two bits, a case where the size of the pieces of A/N information is up to 22 bits, and a case where the pieces of A/N information have a size exceeding 22 bits.

TABLE 2

| Channel information A/N | The case where channel information has a size smaller than 12 bits | The case where channel information has a size exceeding 11 bits |
|---|---|---|
| The case where the size of A/N information is one or two bits. | A terminal transmits A/N and channel information using a PUCCH format 2/2a/2b and uses, as a transmission resource, a transmission resource of a PUCCH format 2 configured through a higher signal. | Alt. 1: A terminal uses a PUCCH format X to perform transmission and uses, as a transmission resource, a resource for the PUCCH format X configured for transmitting channel information. When A/N and channel information that should be transmitted in one subframe have a size greater than a maximum payload size configured by higher information, one piece of channel information is thrown away by priority on channel information transmission, and the A/N and the remaining pieces of channel information having higher priority are transmitted. Alt. 2: A terminal uses a PUCCH format X to perform transmission and uses, as a transmission resource, a resource for the PUCCH format X configured for transmitting channel information. When A/N and channel information that should be transmitted in one subframe have a size greater than a maximum payload size configured by higher information, spatial bundling is applied to the A/N, and the spatial-bundled A/N and the channel information are transmitted together. Even when the spatial-bundled A/N and the channel information have a size greater than the configured maximum payload size after the spatial bundling has been applied thereto, one piece of channel information is thrown away by priority on channel information transmission, and the spatial bundled A/N and the remaining pieces of channel information having higher priority are transmitted. |

TABLE 3

| Channel information A/N | The case where channel information has a size smaller than 12 bits | The case where channel information has a size exceeding 11 bits |
|---|---|---|
| The case where the size of A/N information is up to 22 bits | A terminal transmits A/N and channel information using a PUCCH format 3 and uses, as a transmission resource, a resource indicated by A/N resource indication. When the size of A/N and | Alt. 1: A terminal uses a PUCCH format X to perform transmission and uses, as a transmission resource, a resource for the PUCCH format X configured for transmitting channel information. When A/N and |

TABLE 3-continued

| Channel information A/N | The case where channel information has a size smaller than 12 bits | The case where channel information has a size exceeding 11 bits |
|---|---|---|
| | channel information that should be transmitted in one subframe is greater than 22 bits, spatial bundling is applied to the A/N. Even when the size of the spatial-bundled A/N and the channel information is greater than 22 bits, the channel information is thrown away, and only the A/N is transmitted. | channel information that should be transmitted in one subframe have a size greater than a maximum payload size configured by higher information, partial channel information is thrown away by priority on channel information transmission, and the A/N and the remaining channel information having higher priority are transmitted so as to allow the size of the A/N and the remaining channel information to fall within the range. Alt. 2: A terminal uses a PUCCH format X to perform transmission and uses, as a transmission resource, a resource for the PUCCH format X configured for transmitting channel information. When A/N and channel information that should be transmitted in one subframe have a size greater than a maximum payload size configured by higher information, spatial bundling is applied to the A/N, and the spatial bundled A/N and the channel information are transmitted together. Even when the spatial-bundled A/N and the channel information have a size greater than the configured maximum payload size after the spatial bundling has been applied thereto, partial channel information is thrown away by priority on channel information transmission, and the spatial-bundled A/N and the remaining channel information having higher priority are transmitted so as to allow the size of the spatial-bundled A/N and the remaining channel information to fall within the range. |

TABLE 4

| Channel information A/N | The case where channel information has a size smaller than 12 bits | The case where channel information has a size exceeding 11 bits |
|---|---|---|
| The case where the size of A/N information exceeds 22 bits | Alt. 1: A terminal uses a PUCCH format X to perform transmission and uses, as a transmission resource, a resource indicated by A/N resource indication. When the size of A/N and channel information that should be transmitted in one subframe is greater than a maximum payload | Alt. 1: A terminal uses a PUCCH format X to perform transmission and uses, as a transmission resource, a resource for the PUCCH format X configured for transmitting channel information. When A/N and channel information that should be transmitted in one subframe have a size greater than a maximum payload size |

TABLE 4-continued

| Channel information A/N | The case where channel information has a size smaller than 12 bits | The case where channel information has a size exceeding 11 bits |
|---|---|---|
| | size (or a maximum capacity of the PUCCH format X) configured by higher information, spatial bundling is applied to the A/N. Even when the size of the spatial-bundled A/N and the channel information exceeds a maximum payload size (or a maximum capacity of the PUCCH format X) configured by higher information, the channel information is thrown away, and only the spatial-bundled A/N is transmitted. Alt. 2: A terminal uses a PUCCH format X to perform transmission and uses, as a transmission resource, a resource indicated by A/N resource indication. When the size of A/N and channel information that should be transmitted in one subframe is greater than a maximum payload size (or a maximum capacity of the PUCCH format X) configured by higher information, spatial bundling is applied to the A/N. Even when the size of the spatial-bundled A/N and the channel information is greater than a maximum payload size (or a maximum capacity of the PUCCH format X) configured by higher information, partial channel information having low priority is thrown away, and only the spatial-bundled A/N and the remaining channel information having high priority are transmitted so as to allow the size of the spatial-bundled A/N and the remaining channel information to fall within the range. | configured by higher information, partial channel information is thrown away by priority on channel information transmission, and the A/N and the remaining channel information having higher priority are transmitted so as to allow the size of the A/N and the remaining channel information to fall within the range. Alt. 2: A terminal uses a PUCCH format X to perform transmission and uses, as a transmission resource, a resource for the PUCCH format X configured for transmitting channel information. When A/N and channel information that should be transmitted in one subframe have a size greater than a maximum payload size configured by higher information, spatial bundling is applied to the A/N, and the spatial-bundled A/N and the channel information are transmitted together. Even when the spatial-bundled A/N and the channel information have a size greater than the configured maximum payload size after the spatial bundling has been applied thereto, partial channel information is thrown away by priority on channel information transmission, and the spatial-bundled A/N and the remaining channel information having higher priority are transmitted so as to allow the size of the spatial-bundled A/N and the remaining channel information to fall within the range. Alt. 3: A terminal uses a PUCCH format X to perform transmission and uses, as a transmission resource, a resource indicated by A/N resource indication. When the size of A/N and channel information that should be transmitted in one subframe is greater than a maximum payload size (or a maximum capacity of the PUCCH format X) configured by higher information, spatial bundling is applied to the A/N. Even when the size of the spatial-bundled A/N and the channel information exceeds a maximum payload size (or a maximum capacity of the PUCCH format X) configured by higher information, the channel information is thrown away, and only the spatial-bundled A/N is transmitted. Alt. 4: A terminal uses a PUCCH format X to perform transmission and uses, as a transmission resource, a resource indicated by A/N resource indication. When the size of A/N and channel information that should be transmitted in one subframe is greater than a maximum payload size (or a maximum capacity of the PUCCH format X), which is configured by higher information, spatial bundling is applied to the A/N. Even when the size of the spatial-bundled A/N and the channel information exceeds a maximum payload size (or a maximum capacity of the PUCCH format X) configured by higher information, partial channel information is thrown away by priority on channel information transmission, and the spatial-bundled A/N and the remaining channel information having higher priority are transmitted so as to allow the size of the spatial-bundled A/N and the remaining channel information to fall within the range. |

Figure 3:
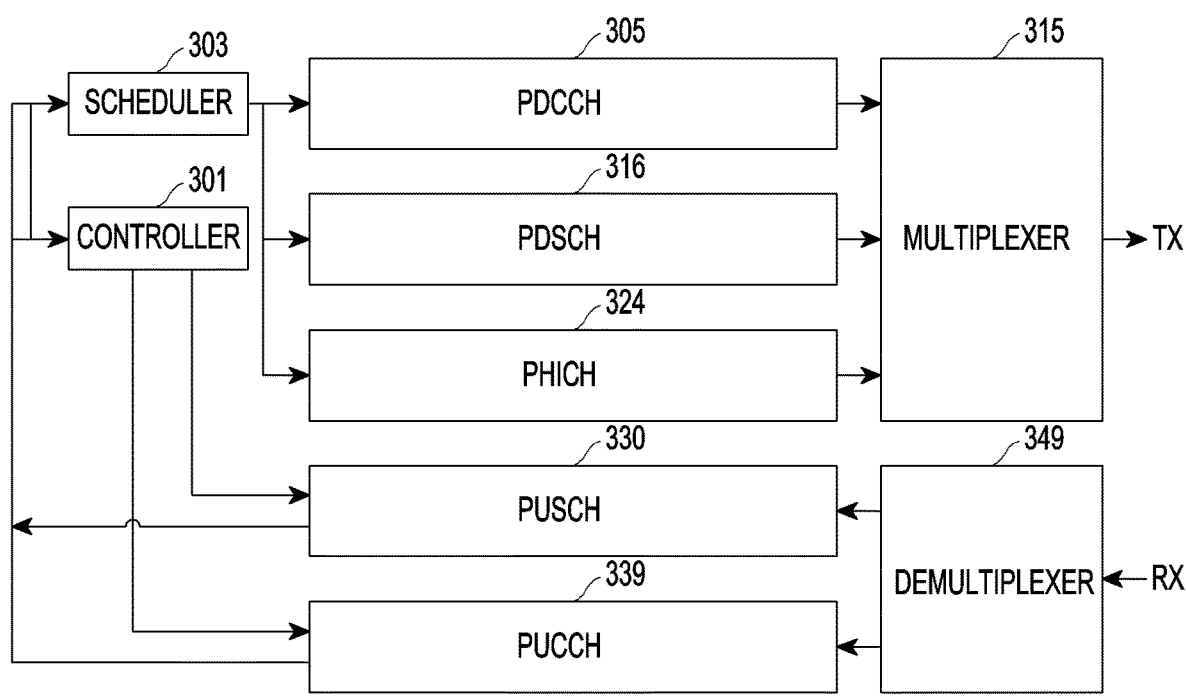
FIG. 3 is a diagram illustrating one example of a configuration of a base station device according to an embodiment of the present disclosure.

FIG. 3 is a diagram illustrating one example of a configuration of a base station device according to an embodiment of the present disclosure.

In FIG. 3, a base station may be an LTE base station or an LAA base station Referring to FIG. 3, a base station device may include: a transmission unit including at least one among a PDCCH block 305, a PDSCH block 316, a PHICH block 324, and a multiplexer 315; a reception unit including at least one among a PUSCH block 330, a PUCCH block 339, and a demultiplexer 349; a controller 301 configured to perform control of A/N reception and channel information reception according to at least one among the embodiments of the present disclosure; and a scheduler 303. For transmission/reception in a plurality of cells, there may be a plurality of transmission units and a plurality of reception units (excluding the PUCCH block). However, for convenience of description, it is assumed that only one transmission unit and only one reception unit exist.

The controller 301 including control of A/N reception and channel information reception adjusts a mutual timing relation between each of physical channels in relation to a terminal to be scheduled, in consideration of an amount of data to be transmitted to the terminal, an amount of resources usable in the system, etc. and then notifies the scheduler 303, the PDCCH block 305, the PDSCH block 316, the PHICH block 324, the PUSCH block 330, and the PUCCH block 339 of the adjusted relation. The A/N reception and/or channel information reception follows a method explained in at least one among the above embodiments of the present disclosure.

The PDCCH block 305 configures control information while being controlled by the scheduler 303, and the control information is multiplexed with other signals by the multiplexer 315.

The PDSCH block 316 generates data so as to transmit required higher information to a terminal while being controlled by the scheduler 303, and the data is multiplexed with other signals by the multiplexer 315.

The PHICH block 324 generates HARQ ACK/NACK for a PUSCH received from the terminal while being controlled by the scheduler 303. The HARQ ACK/NACK is multiplexed with other signals by the multiplexer 315.

Further, an OFDM signal is generated from the multiplexed signals and is then transmitted to the terminal.

The PUSCH block 330 of the reception unit obtains, from a PUSCH, channel information about a signal received from the terminal.

The PUCCH block 330 obtains uplink ACK/NACK or CQI from a signal received from the terminal. The acquired uplink ACK/NACK or CQI is provided to the scheduler 303 to be used in determining a modulation and coding scheme (MCS) and whether to retransmit a PDSCH. Further, the acquired uplink ACK/NACK is provided to the controller 301 to adjust the transmission timing of the PDSCH. The controller 301 controls overall operations of the device including the blocks.

The configuration example in FIG. 3, as another implementation example, shows the configuration of a base station device using a functional block. The base station device may include: a controller (or at least one processor) that controls A/N reception and/or channel information reception according to at least one among the above embodiments; and a transmitter/receiver configured to communicate with a terminal.

Figure 4:
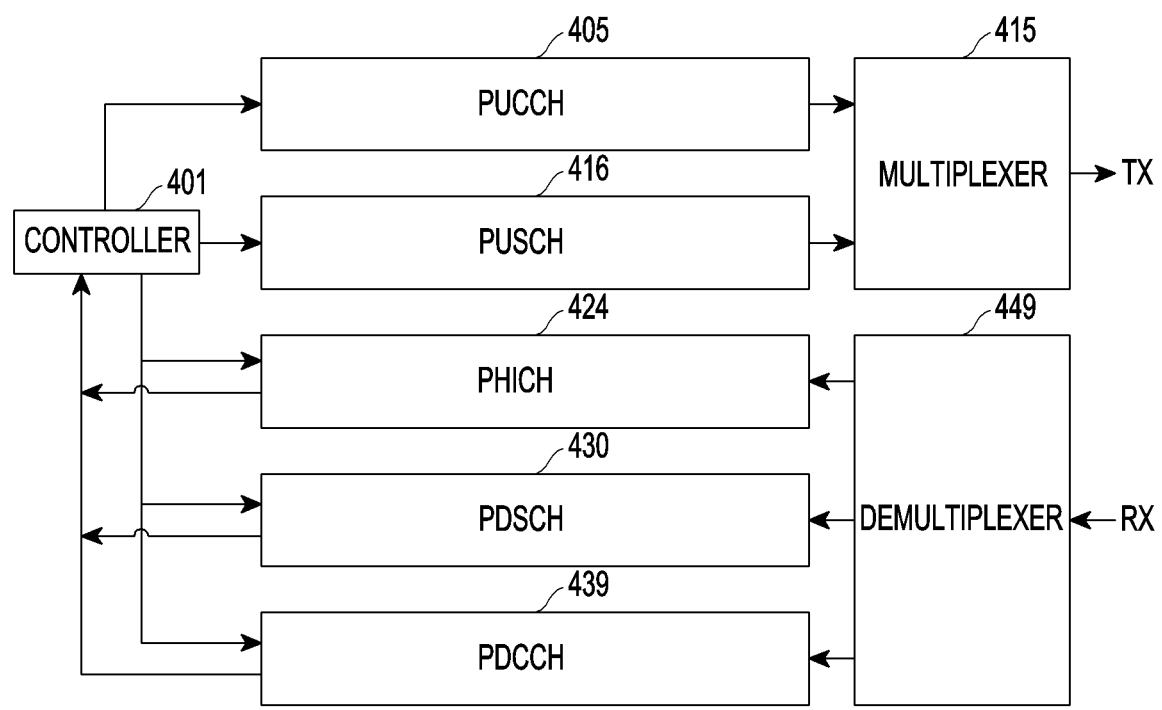
FIG. 4 is a diagram illustrating one example of a configuration of a terminal device according to an embodiment of the present disclosure.

FIG. 4 is a diagram illustrating one example of a configuration of a terminal device according to an embodiment of the present disclosure.

Referring to FIG. 4, a terminal may include: a transmission unit including at least one among a PUCCH block 405, a PUSCH block 416, and a multiplexer 415; a reception unit including at least one among a PHICH block 424, PDSCH block 430, a PDCCH block 439, and a demultiplexer 449; and a controller 401 configured to perform control of A/N transmission and channel information transmission according to at least one among the above embodiments of the present disclosure. For transmission/reception in a plurality of cells, there may be a plurality of transmission units and a plurality of reception units. However, in the following description, it is assumed that only one transmission unit and only one reception unit exist.

The controller 401 configured to control A/N transmission and/or channel information transmission according to the present disclosure notifies the PDSCH block 430, the PDCCH block 439, the PUCCH block 405, and the PUSCH block 416 of related information according to the present disclosure. The A/N transmission and/or channel information transmission follows a method explained in at least one among the above embodiments of the present disclosure.

The PUCCH block 405 configures an HARQ ACK/NACK or CQI as uplink control information (UCI) while being controlled by the controller 401 that controls to store downlink data in a soft buffer, and the HARQ ACK/NACK or CQI is multiplexed with other signals by the multiplexer 415 and the multiplexed HARQ ACK/NACK or CQI is transmitted to a base station.

Channel information in the PUSCH block 416 is multiplexed with other signals by the multiplexer 415. The multiplexed signals are generated as a single carrier frequency division multiple access (SC-FDMA) signal, and the generated SC-FDMA signal is transmitted to the base station in consideration of a frequency and offset in a method for transmitting A/N and channel information according to the present disclosure.

The PHICH block 424 of the reception unit separates, through the demultiplexer 449, a PHICH signal from a signal received from a base station depending on a DL/UL HARQ-ACK transmission/reception timing and then obtains whether there is an HARQ ACK/NACK for a PUSCH.

The PDSCH block 430 separates, through the demultiplexer 449, a PDSCH signal from a signal received from the base station with respect to higher configuration information relating to A/N transmission and channel information transmission, then obtains PDSCH data, notifies the PUCCH block 405 of whether there is an error on a result obtained by decoding the data to adjust the generation of an uplink HARQ ACK/NACK, and applies whether there is an error on the decoding result to the controller 401 so as to adjust a timing of a case when the uplink HARQ ACK/NACK is transmitted.

The PDCCH block 439 separates a PDCCH signal through the demultiplexer 449 and then decodes a DCI format to obtain DCI from a decoded signal. The controller 401 controls overall operations of the device including the blocks.

The configuration example in FIG. 4, as another implementation example, shows the configuration of a terminal device using a functional block. The terminal device may include: a controller (or at least one processor) that controls A/N transmission and/or channel information transmission according to at least one among the above embodiments; and a transmitter/receiver configured to communicate with a base station.

Hereinafter, embodiments of the present disclosure in which a channel is detected in an unlicensed band to transmit and receive control information will be explained.

Hereinafter, embodiments of the present disclosure are described using, for example, an LTE system and an LTE-A system. However, the present disclosure can be applied to the other communication systems using a licensed band and an unlicensed band without particular modification. In addition, the present disclosure will be explained on an assumption that a cell that transmits data using an unlicensed band is configured and operated as an SCell. However, the present disclosure can be applied to a case where a cell operating in an unlicensed band is configured and operated as a PCell or primary secondary cell (PSCell). Also, in embodiments of the present disclosure, a base station or cell that performs communication using an unlicensed band may be expressed as an LAA S cell, an LAA cell, an LAA base station, or a base station. A terminal that performs communication using an unlicensed band may be mixedly expressed by an LAA terminal, an LAA UE, an UE, or a terminal, but the meanings thereof are the same. In addition, in the present disclosure, some of OFDM symbols which are in a subframe used in a general LTE communication and are used for transmitting a control signal or channel, or a data channel are expressed by a partial subframe. For example, a subframe that performs transmission of control information or channel, or data channel using 0 to k−1 OFDM symbols (wherein, k−1<13) among 14 OFDM symbols (0, 1, 2, . . . , 13 OFDM symbol) constituting a 1 ms subframe, or a subframe that performs transmission of control information or channel, or data channel using k to 13 OFDM symbols (wherein, k>0) will be expressed as a partial subframe. In addition, for convenience of explanation, embodiments of the present disclosure will be explained on an assumption of a carrier aggregation (CA) environment. However, the embodiments are not limited thereto and can also be applied to dual-connectivity or an environment (stand-alone) allowing operation only in an unlicensed band. In addition, for convenience of explanation, embodiments of the present disclosure will be explained on an assumption that an LAA cell transmits, to an LAA terminal, downlink control information or a downlink control channel, or downlink data using an unlicensed band. However, the embodiments can also be applied to a case where an LAA terminal transmits, to an LAA cell, uplink control information or an uplink control channel, or uplink data using an unlicensed band.

AN LTE/LTE-A (hereinafter, referred to as LTE) system has continuously developing standards and is evolved so as to improve the system capacity and frequency efficiency. Typically, the LTE system may dramatically increase a data transmission rate and a system capacity using carrier aggregation (CA) which may operate a system using a plurality of frequency bands. However, the frequency band where the current LTE system is operated is a licensed band (licensed spectrum or licensed carrier) that can be generally used by a business operator who has unique authorization. However, the frequency band (e.g., a frequency band less than or equal to 5 GHz) that generally provides a wireless communication service has already been occupied and used by another operator or another communication system and thus, it may be difficult for the operator to secure a plurality of licensed band frequencies and it is also difficult to extend the system capacity using the CA technology. Therefore, to process mobile data that exclusively increases in the environment where securing the licensed band frequency is difficult, technologies for utilizing the LTE system in an unlicensed band (unlicensed spectrum or unlicensed carrier) have been recently studied (e.g., LTE-U:LTE in unlicensed, LAA: Licensed-Assisted Access). Particularly, in the case of a 5 GHz band in the unlicensed band, a relatively smaller number of communication devices use the band when compared to an unlicensed band of 2.4 GHz, and a significantly large bandwidth can be utilized and thus, the band is relatively easier to be used for securing additional frequency bands. In other words, the licensed band and unlicensed band frequencies may be utilized through LTE technology that aggregates a plurality of frequency bands and uses aggregated frequency bands, that is, CA technology. For example, an LTE system may be operated in the licensed band and unlicensed band through the existing CA technology, by setting an LTE cell in the licensed band as a PCell (or Pcell), and setting an LTE cell (LAA cell or LTE-U cell) in the unlicensed band as an SCell (or Scell). The system may be applicable to not only CA that connects the licensed band and the unlicensed band through an ideal backhaul, but also to the dual-connectivity environment where the licensed band and the unlicensed band are connected through a non-ideal backhaul. However, embodiments of the present disclosure will be described by assuming the CA environment where the licensed band and the unlicensed band are connected through the ideal backhaul.

Figure 5A:
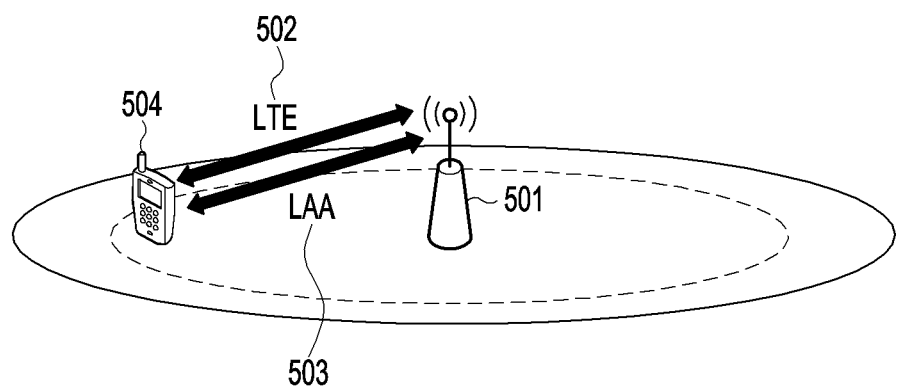
FIGS. 5A and 5B are diagrams illustrating one example of a communication system to which an embodiment of the present disclosure is applied.
Figure 5B:
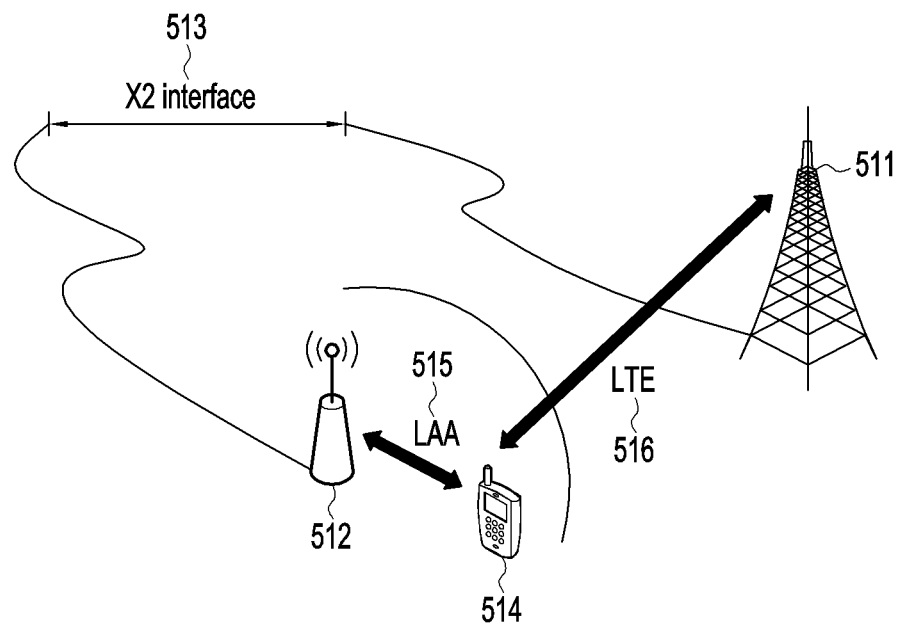

FIGS. 5A and 5B are diagrams illustrating one example of a wireless communication system to which an embodiment of the present disclosure is applied.

Referring to FIGS. 5A and 5B, FIG. 5A illustrates coexistence between an LTE cell 502 and an LAA cell 503 within the coverage of one small base station 501 in a network, and a terminal 504 transmits and receives data through the LTE cell 502 and the LAA cell 503 to and from the base station 501. The duplex scheme of the LTE cell 502 or the LAA cell 503 is not limited. A cell that executes data transmission/reception using a licensed band may be assumed to be the LTE cell 502 or a PCell, and a cell that executes data transmission/reception using an unlicensed band may be assumed to be the LAA cell 503 or an SCell. Uplink transmission may be limited to only being possible through the LTE cell 502 when the LTE cell is a PCell.

FIG. 5B illustrates a network in which an LTE macro base station (hereinafter, LTE base station) 511 for wide coverage and an LAA small base station (hereinafter, LAA base station) 512 for increasing a data transmission amount are installed. In this case, there is no limitation on a duplex scheme of the LTE base station 511 or the LAA base station 512. The LTE base station 511 may be replaced by an LTE base station. In addition, uplink transmission may be configured to be possible only through the LTE base station 511 when the LTE base station is a PCell. The LTE base station 511 and the LAA base station 512 are assumed to have an ideal backhaul network. Therefore, communication using an X2 interface 513 is possible between the base stations. Therefore, even when an uplink is transmitted only to the LTE base station 511, the LAA base station 512 can receive related control information through the X2 interface 513 from the LTE base station 511 in real time. Hereinafter, methods proposed in embodiments of the present disclosure can be applied to both the system of FIG. 5A and the system of FIG. 5B.

Figure 6:
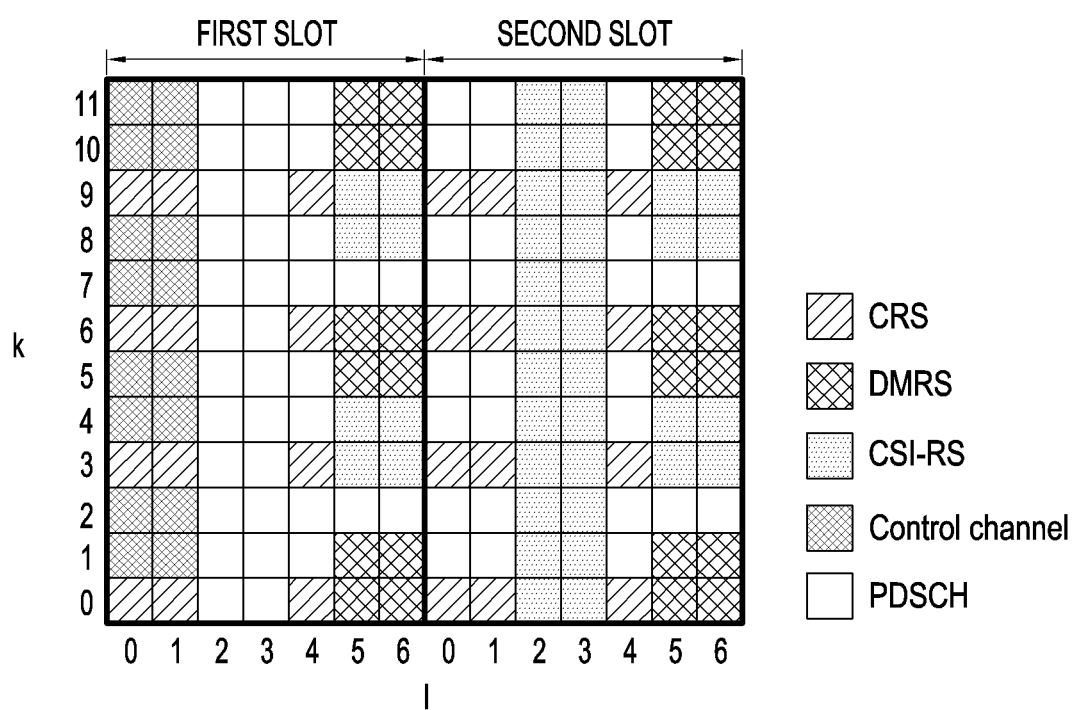
FIG. 6 is a diagram illustrating one example of a wireless resource configuration of an LTE system.

In general, the LTE/LTE-A system transmits data using an orthogonal frequency division multiple access (OFDM) transmission scheme. In the OFDM scheme, a modulation signal is located in a two-dimension (2D) resource formed of a time and a frequency. Resources on the time axis are distinguished by different OFDM symbols, and are orthogonal to one another. Resources on the frequency axis are distinguished by different sub-carriers, and are orthogonal to one another. That is, in the OFDM scheme, it is possible to indicate one minimum unit resource by designating a particular OFDM symbol on a time axis and designating a particular sub-carrier on a frequency axis, and the one minimum unit resource is called a resource element (RE). Different REs are orthogonal to one another although they pass through a frequency selective channel and thus, signals transmitted through different REs may be received by a reception side without mutual interference. In an OFDM communication system, a downlink band (bandwidth) includes a plurality of resource blocks (RBs), and each physical resource block (PRB) may be configured by 12 sub-carriers arranged along a frequency axis and seven or six OFDM symbols arranged along a time axis, as illustrated in FIG. 6. A subframe or a subframe on the time axis is configured by two slots, each having a length of 0.5 msec, i.e. a first slot and a second slot, as shown in FIG. 6. Multiple different types of signals as below may be transmitted in a wireless resource illustrated in FIG. 6.

1. Cell specific RS (CRS): The CRS is a reference signal that is periodically transmitted for all terminals belonging to one cell and can be commonly used by a plurality of terminals.

2. Demodulation reference signal (DMRS): The DMRS is a reference signal transmitted for a specific terminal, and is transmitted only when data is transmitted to a corresponding terminal. The DMRS may include a total of 8 DMRS ports. In the LTE/LTE-A system, port 7 to port 14 correspond to the DMRS ports, and respective ports maintain orthogonality so as not to incur interference with each other using code division multiplexing (CDM) or frequency division multiplexing (FDM).

3. Physical downlink shared channel (PDSCH): The PDSCH is used by a base station to transmit traffic to a terminal through a data channel transmitted by a downlink and is transmitted by using REs in which a reference signal is not transmitted in a data region of FIG. 6.

4. Channel status information reference signal (CSI-RS): The CSI-RS is a reference signal transmitted for terminals belonging to one cell and is used for measuring the state of a channel. A plurality of CSI-RSs may be transmitted from one cell. For example, in the LTE-A system, one CSI-RS may correspond to one, two, four, or eight antenna ports.

5. Other control channels (PHICH, PCFICH, and PDCCH): The other control channels are used for providing control information required for a terminal to receive a PDSCH or transmitting an ACK/NACK for managing an HARQ for data transmission of an uplink.

A physical dedicated control channel (PDCCH) region which is a control channel region and an enhanced PDCCH (ePDCCH) region which is a data channel region are separately transmitted in the time axis. This is to quickly receive and demodulate a control channel signal. In addition, the PDCCH region exists over the entire downlink band. A single control channel is divided into small units of control channels and the control channels are located by being distributed over the entire downlink band. An uplink is generally divided into an uplink control channel (PUCCH) and an uplink data channel (PUSCH), and other feedback information and a response channel for a downlink data channel are transmitted through the PUCCH when there is no transmission of the PUSCH, and through the PUSCH when there is transmission of the PUSCH.

Generally, a plurality of devices can share and use the same frequency band or channel in an unlicensed band. The devices that use the unlicensed band may be different systems. Therefore, for the coexistence of various devices, general operations of the devices operating in the unlicensed band are as follows.

A transmission device that includes data, control information, or the like and thus requires signal transmission may determine whether other devices occupy a channel with respect to an unlicensed band or the channel, in which the signal transmission is performed, before performing the signal transmission, and occupy to use or fail to occupy the channel depending on the determined states of whether the other devices have occupied the channel or not. This operation is generally referred to as listen-before-talk (LBT). In other words, a transmission device may determine whether the channel can be occupied, according to a previously defined or configured method, and occupy and use the channel when the channel is in an idle state. In addition, a section (or time interval) in which the channel is detected may be previously defined, configured depending on the type of a transmission signal, a defined priority, or the like, or selected as a random value in a particular range. The section or time interval required for detecting the channel may be configured by a transmission device or depending on a maximum channel occupancy time interval (maximum channel occupancy time) configured by the transmission device. As described above, a transmission device performs a channel detecting operation in order to determine whether the transmission device can occupy a channel. The channel detecting operation of detecting a channel may be differently configured depending on an unlicensed frequency band in which the detecting operation is performed, or the regulations for each region and country. For example, currently in the U.S., an unlicensed band may be used without a separate channel detecting operation, excluding an operation for Radar detection in a 5 GHz frequency band.

A transmission device that desires to use an unlicensed band may detect whether other devices use a corresponding channel through the channel detecting operation (or LBT) described above, and may occupy and use the channel when the channel occupancy of other devices is not detected from the channel. After executing the channel detecting operation, the transmission devices that use an unlicensed band may previously define or configure a maximum channel occupancy time interval (channel occupancy time), during which a corresponding channel is continuously occupiable, and an operation may be proceeded during the defined or configured time interval. A maximum occupiable time interval may be defined in advance based on the regulations defined according to a frequency band and/or region, etc. In the case of another transmission device, for example, a terminal, a maximum occupiable time interval may be separately configured by a base station. The channel occupancy time interval may be differently configured depending on an unlicensed band or the regulations for each region and country. For example, in the case of Japan, the maximum occupiable time interval in the 5 GHz unlicensed band is regulated to 4 ms. Conversely, in the case of Europe, a channel may be occupied and used continuously up to 10 ms or 13 ms. Devices that occupy a channel during the maximum occupancy time interval may re-execute a channel detecting operation, and then re-occupy the channel according to a result of the channel detection.

Figure 7:
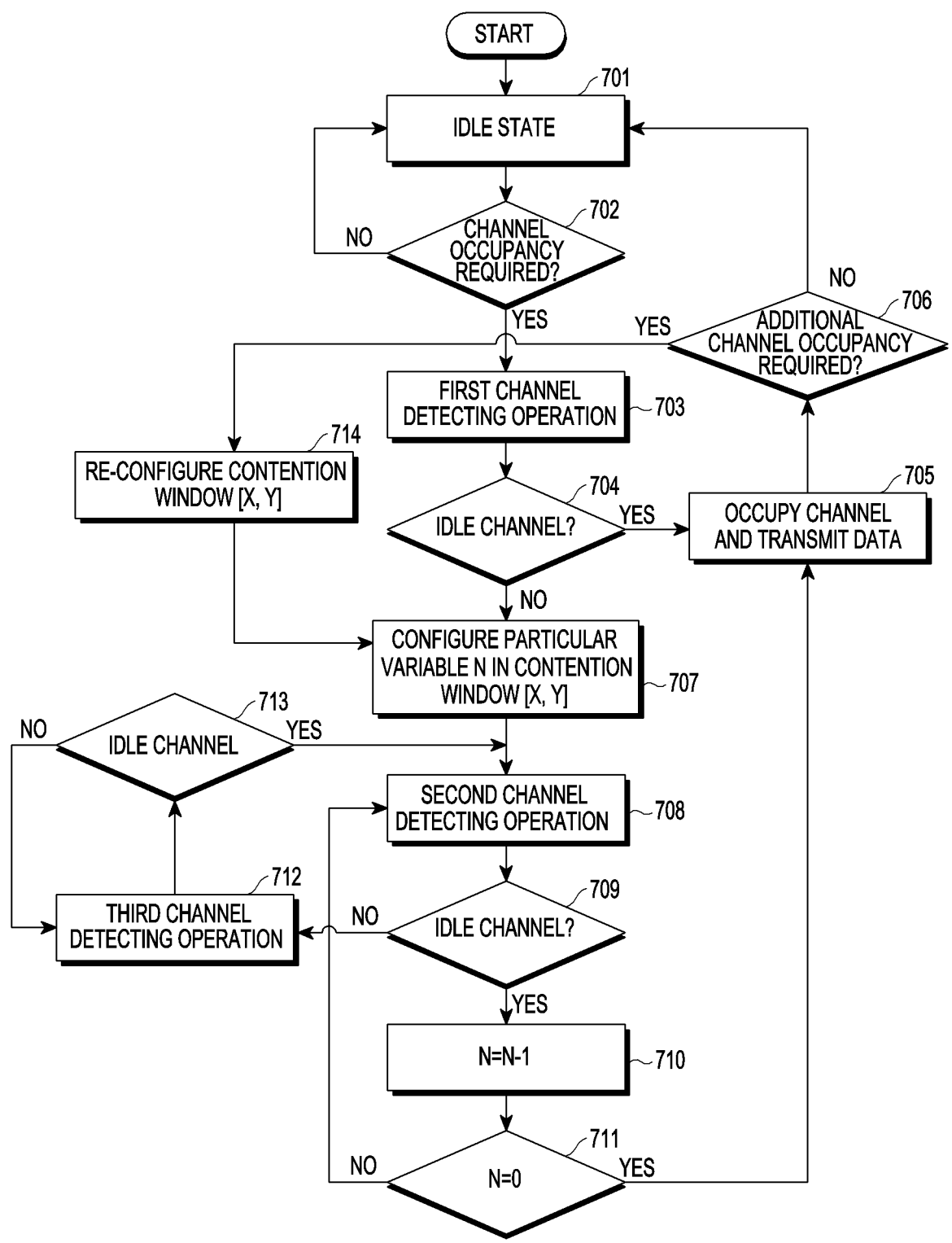
FIG. 7 is a flowchart illustrating a channel access method in an unlicensed band of an LAA system according to an embodiment of the present disclosure.

FIG. 7 is a flowchart illustrating a channel access method in an unlicensed band of an LAA system according to an embodiment of the present disclosure.

A scheme for occupying a channel to use an unlicensed band in an LAA system will be described with reference to FIG. 7 as follows. In operation 701, an LAA cell (or LAA SCell, LAA Cell, LAA base station) which is not required to transmit data maintains an idle state. The idle state is a state in which the LAA cell does not transmit a data signal in an unlicensed band. When, in operation 702, the LAA cell in the idle state needs to occupy a channel in order to transmit data or control information to a terminal, the LAA cell may perform a first channel detecting operation in operation 703. The first channel detecting operation may be differently configured depending on at least one condition from among a previously configured time interval (e.g. 34 us), a time interval configured by another transmission device, or a type of data or control information to be transmitted by the LAA cell. For example, when only control information is transmitted without data being transmitted from the LAA cell to a particular terminal, a time interval during which the first channel detecting operation is performed may be configured to be different from a time interval during which a first channel detecting operation is performed in a case where the LAA cell transmits data to the particular terminal (e.g., when only control information is transmitted, the first channel detecting operation is performed during a time interval shorter than a time interval of data signal transmission). Values that can be configured for the first channel detecting operation may be defined in advance. Here, in addition to a time interval during which the first channel detecting operation is performed, at least one of other variables (e.g., a reception signal strength threshold value for determining whether a channel is detected) relating to the first channel detecting operation may be configured to be different between the case where only a control signal is transmitted without data transmitted from the LAA cell to the particular terminal and the case where the LAA cell transmits data to the particular terminal. The first channel detecting operation may be performed in a static section without the configuration of a separate contention window, or the LAA cell may be configured to have, as an initial value, a contention window used by a second channel detecting operation, and then operated. The first channel detecting operation may identify an occupancy state of a corresponding channel by other devices, using various methods including at least one among the measurement of a received signal strength, the detection of a previously defined signal, or the like, during a time interval configured for the first channel detecting operation.

When it is determined that the detected channel is in an idle state in operation 704, the LAA cell may occupy the channel and transmit a signal in operation 705. When it is determined that the channel has been occupied by other transmission devices in operation 704, a random variable N in a contention window [x, y], which is configured in operation 707, may be selected, and a channel detecting operation may be performed. The first contention window [x, y] may be previously defined or be configured by a base station. Also, the configured contention window may be modified or configured using various values including the number of attempts to occupy the channel, an occupancy rate of the channel (e.g., traffic load), or a reception result (e.g., ACK/NACK) of a terminal with respect to a data signal transmitted during the occupancy of the channel. For example, when the LAA cell that has occupied the channel in operation 705 determines that the LAA cell needs to additionally occupy the channel in operation 706, the contention window may be modified or configured in operation 714, using a result obtained from data transmission performed in operation 705, or a reception result of a terminal with respect to data transmission performed before operation 705. The above method of configuring a contention window using the result of the data transmission in operation 705 is merely an example, and a contention window may be configured according to a previous channel occupancy and a data transmission operation or a previously configured value. For example, when the LAA cell transmits data to a terminal during the channel occupancy interval, and receives, from the terminal, an NACK as a result of the reception with respect to the data transmission, the LAA cell may increase or maintain the contention window. When the LAA cell that occupies the channel using the increased or maintained contention window transmits data to the terminal in the channel occupancy interval and receives, from the terminal, ACK as a result of the reception with respect to the data transmission, the LAA cell may decrease or maintain the contention window, or configure, as an initial contention window, the contention window. The method of configuring a contention window using ACK/NACK may be merely an example, and the contention window may be configured using the above described other reference.

When a random variable N is configured in the initial contention window in operation 707 or the contention window configured in operation 714, a second channel detecting operation may be performed using the configured N in operation 708. The second channel detecting operation is an operation of determining an occupancy state of a channel using at least one among the measurement of the strength of a signal received during a configured time interval, the detection of a previously defined signal, or the like, and may use a scheme different from the first channel detecting operation. That is, a second channel detecting operation reference time interval may be configured to be identical to that of the first channel detecting operation or shorter than a first channel detecting time interval. For example, the first channel detecting time interval is configured to be 34 us, and the second channel detecting time interval may be configured to be 9 us. Also, a second channel detecting operation reference threshold value may be configured to be different from a first channel detecting operation reference threshold value.

When a channel detected in operation 708 according to the second channel detecting operation is determined to be an idle channel in operation 709, a value of 1 is subtracted from the variable N configured in operation 707, in operation 710. The subtracting of 1 is merely an example, and the subtraction may be configured to be performed by different values depending on a configuration value, or be performed by different values depending on the type or characteristic of a signal to be transmitted by the LAA cell. When a value of the variable N is 0 in operation 711, the LAA cell starts occupying a channel and can transmit control information or a data signal in operation 705. When the variable N is not 0 in operation 711, the LAA cell executes the second channel detecting operation again in operation 708. When it is determined that the channel is not an idle channel through the second channel detecting operation of operation 708, in operation 709, the LAA cell may execute a third channel detecting operation through operation 712. The third channel detecting operation may be configured to be identical to at least one among the first channel detecting operation and the second channel detecting operation, or may be configured to be different from both operations. For example, the first channel detecting operation reference time interval and a third channel detecting operation reference time interval may be identically configured to be 34 us. The first channel detecting reference threshold value and a third channel detecting reference threshold value may be configured to be different from each other. The channel detecting operation reference time interval and threshold value are merely examples, and variables or references required for the third channel detecting operation may be configured to be identical to those of the first channel detecting operation or at least one of them may be configured to be different.

In addition, the third channel detecting operation may be configured to perform an operation of generating a time delay without a separate channel detecting or channel occupying operation. The LAA cell determines whether other devices occupy the channel, using a reference value configured for the third channel detecting operation in operation 713. When the determined channel occupancy state is in an idle state, the second channel detecting operation may be executed again in operation 708. When the channel determined in operation 713 is not in an idle state, the LAA cell may perform the third channel detecting operation configured in operation 712, again. At least one among the first channel detecting operation, the second channel detecting operation, and the third channel detecting operation may be omitted depending on the type or characteristic of data or a control signal to be transmitted by the LAA cell. For example, when the LAA cell transmits only control information (e.g. discovery reference signal (DRS), the LAA cell performs only the first channel detecting operation and then immediately occupies a channel according to a result of the channel detecting operation to transmit a DRS signal. The DRS is merely an example in which at least one among the first channel detecting operation, the second channel detecting operation, and the third channel detecting operation can be omitted, and the omission may be applied to a case when another control signal is transmitted.

The contention window applied to at least the second channel detecting operation may be modified or re-configured in operation 714. The contention window may be configured using at least one among the number of attempts to occupy the channel, an occupancy rate of the channel (e.g. traffic load), or a reception result (e.g., ACK/NACK) of a base station or a terminal with respect to a data signal transmitted through an unlicensed band during the occupancy of the channel. The contention window modification or re-configuration method is merely an example, and the contention window may be modified or re-configured by various methods including the method.

Figure 8:
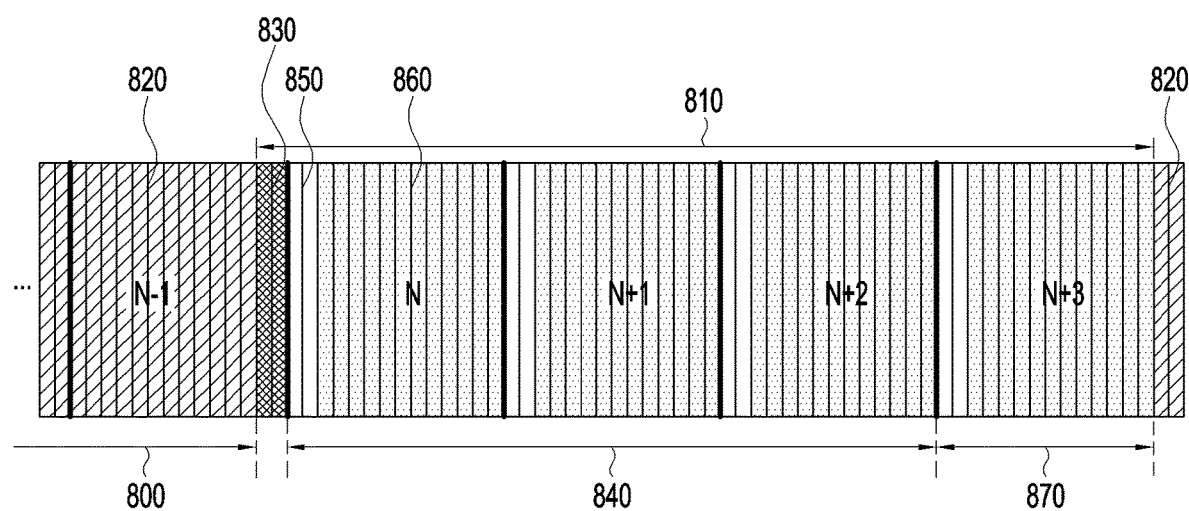
FIG. 8 is a diagram illustrating a channel access operation about an unlicensed band in an LAA system according to an embodiment of the present disclosure.

FIG. 8 is a diagram illustrating a channel access operation in an unlicensed band of an LAA system according to an embodiment of the present disclosure.

The channel detecting operation and channel occupying operation in an unlicensed band as described above will be described with reference to FIG. 8 as follows. FIG. 8 illustrates an example of a downlink transmission process in which a transmission node (e.g. LAA cell) transmits data or a control signal to a reception node (e.g. LAA terminal). However, the method of FIG. 8 can also be applied to an uplink transmission case in which an LAA terminal transmits a signal to an LAA cell.

A subframe used in an LTE system in FIG. 8 is a subframe having a length of 1 ms and may include a plurality of OFDM symbols (e.g. 14 OFDM symbols in the case of a normal CP). With respect to a transmission node (hereinafter, LAA cell or base station) and a reception node (hereinafter, LAA terminal or terminal) that performs communication using an unlicensed band, the transmission node may perform a channel detecting operation 800. Then, according to a result of the performed channel detecting operation, for example, when it is determined that a corresponding unlicensed band is in an idle state through the channel detecting operation, the transmission node may occupy a corresponding channel during a maximum channel occupancy time interval (or transmission opportunity (TXOP)) 810, which is previously defined or is configured, to perform communication in the unlicensed band. The LAA cell may occupy the channel during a time interval (e.g. a time interval indicated by reference numeral 840) shorter than the maximum channel occupancy time interval. When, through the channel detecting operation, it is determined that the corresponding unlicensed band has been occupied by other transmission devices through, the channel detecting operation may be continuously performed. When the LAA cell that has occupied the channel during the configured channel occupancy time interval 810 needs to additionally occupy the channel, the LAA cell may re-perform a channel detecting operation 820 and then occupy and use the channel again or fail to occupy the channel depending on a result of the channel detecting operation. Then, a required channel detecting interval (or length) may be configured to be different from that of the previous channel detecting operation 800 depending on a transmission/reception result of data transmitted through an unlicensed band. Also, at least one among the variables that are applied to the re-executed channel detecting operation may be configured to be different from those of the previous channel detecting operation.

The channel detecting and occupying operation may be differently configured depending on a frequency band or the regulations defined for each region or country. The channel detecting and occupying operation will be more specifically described as follows through, as an example, the Load-based equipment which is one of the channel access methods in EN301 893 that is the regulations associated with the 5 GHz band in Europe.

When the LAA cell needs to occupy a channel in an unlicensed band, the LAA cell should determine whether the channel is occupied by other transmission devices, during a minimum channel detecting interval. The minimum channel detecting interval may be determined by <mathematical formula 1> according to the maximum channel occupancy interval.

Maximum channel occupancy interval: $13/32 \times q$, ($q=4, \ldots, 32$)

Minimum channel detecting interval: ECCA slot length×rand(1,$q$)   <Mathematical formula 1>

Wherein, the extended clear channel assessment (ECCA) slot length is a channel detecting interval minimum unit (or length, e.g. 9 us) which is previously defined or configured. That is, when it is configured that $q=32$, a transmitting device may occupy an unlicensed band for a maximum of 13 ms. A minimally required channel detecting interval may be a random value selected from between 1 to q (i.e. between 1 to 32), and a total channel detecting interval may be a value calculated by multiplexing the ECCA slot length and the selected random value as shown in <mathematical formula 1>. Therefore, as the maximum channel occupancy interval increases, the minimum channel detecting interval also increases, generally.

The method of configuring the maximum channel occupancy interval and the minimum channel detecting interval is merely an example, and the method may be differently applied depending on a frequency band and the regulations defined for each region and country and may vary according to the future revision of the regulations on frequencies. Also, the method may be configured to include an additional operation (e.g. the introduction of an additional channel detecting interval) or the like, in addition to the channel detecting operation according to the regulations on frequencies. The specific configuration on the channel detecting operation may be modified through the modification of the regulation on regions or frequency bands or the configuration of the LAA cell.

When the base station does not detect other transmission devices that use a corresponding unlicensed band in the channel detecting interval 800, that is, the base station determines that the channel is in an idle state, the base station may immediately occupy and use the channel. Determination on whether another device occupies the channel, executed in the channel detecting interval 800, may be executed by using a reference value previously defined or configured. For example, when the strength of a reception signal received from other devices during the channel detecting interval is greater than a predetermined reference value (e.g. −62 dBm), it may be determined that the channel is occupied by other transmission devices. When the strength of the reception signal is smaller than the reference value, it may be determined that the channel is in the idle state. The channel occupancy determining method may include the detection of a previously defined signal (e.g. initial signal), etc. in addition to the strength of the reception signal, as described above.

In FIG. 8, the LAA cell can occupy the unlicensed band from a random OFDM symbol in a subframe according to a channel detecting operation termination time point of the LAA cell. However, a general LTE operation is operated one subframe by one subframe (e.g. a signal transmission and reception operation is performed from a first OFDM symbol of a subframe). Therefore, a signal transmitted from a random OFDM symbol cannot be transmitted or received. Therefore, a base station that detects an idle channel through the channel detecting operation 800 at a particular time in a subframe may transmit a particular signal 830 for occupying the channel, from a time point at which the channel detecting interval 800 is terminated, until immediately before a first OFDM symbol of a next subframe N is transmitted. In other words, before the base station transmits a first signal (e.g. at least one signal among the existing (E)PDCCH and PDSCH, a modified (E)PDCCH and PDSCH, a control signal (CRS, DMRS, CSI-RS), and a control channel (PCFICH, PHICH)) that is transmitted in a subframe N, the base station may transmit a second signal 830, for example, at least one signal among a primary synchronization signal (PSS)/secondary synchronization signal (SSS)/CRS, a newly defined signal, and signals defined by a transmission node, for the channel occupancy in a corresponding unlicensed band and the synchronization of a terminal. At least one among second signals that are transmitted may not be transmitted depending on a channel detecting interval termination time point. In addition, when a corresponding channel occupancy start time point is configured to be located before a particular OFDM symbol, the base station transmits a third signal 820 (e.g. a signal that is newly defined in a preamble type) until a next OFDM symbol start time point and then transmits the second signal 830. In embodiments of the present disclosure, for ease of description, although a channel detecting operation interval is described using an OFDM symbol unit, a channel detecting operation interval may be configured irrespective of an OFDM symbol of the LTE system.

Here, a PSS/SSS that is used in the current LTE system may be reused as the second signal, or the second signal may be generated using at least one of a PSS and an SSS using a sequence different from a root sequence that is used in the current licensed band. Also, the second signal may be generated by using other sequences excluding a PSS/SSS sequence that is required for generating an unlicensed band base station unique value (physical cell ID (PCID)), and may be used by being distinguished from a base station unique value. Also, the second signal may include at least one of a CRS and a CSI-RS which are used in the current LTE system, or an (E)PDCCH, a PDSCH, or a signal modified therefrom may be used as the second signal. A new second signal may be defined by a base station or a transmission node and then used.

When, as described above, the LAA cell starts occupying a channel through a channel detecting operation and transmits the second signal up to a next subframe, an interval 840 of transmitting data or control information by occupying an actual unlicensed band may be smaller than the maximum channel occupancy interval 810. In other words, the above current LTE system in which a signal transmission and reception operation is performed from the first OFDM symbol of a subframe, or a signal transmission and reception operation is performed up to the last OFDM symbol of a subframe may not efficiently use the unlicensed band. Therefore, a method in which a signal transmission and reception operation can be performed from a random OFDM symbol of a subframe and a signal transmission and reception operation can be performed up to a random OFDM symbol of a subframe is required. When a signal is transmitted or received in all the random OFDM symbols of a subframe, a terminal that receives data or control information/channel performs a reception operation on all the cases. The reception operation on all the cases may increase terminal complexity as well as power usage for receiving data or control information/channel by a terminal. Therefore, embodiments of the present disclosure propose a method for configuring a structure of an LAA subframe and transmitting the configuration information to an LAA terminal, wherein an LAA cell transmits at least one signal among a data channel, a control signal, and a control channel up to the last OFDM symbol of a subframe, at the most, within a maximum channel occupancy interval, and an LAA terminal correctly receives the signal, so that the unlicensed band can be efficiently used.

In addition, for convenience of explanation, embodiments of the present disclosure will be explained on an assumption of a carrier aggregation (CA) environment. However, the embodiments are not limited thereto and can also be applied to dual-connectivity or an environment (stand-alone) allowing operation only in an unlicensed band.

When, as described above, an LAA cell starts occupying a channel through a channel detecting operation and transmits a second signal up to a next subframe (or up to a previously defined or configured data channel or control channel transferable time point), an interval 840 of transmitting a data channel or a control channel by occupying an actual unlicensed band may be smaller than the maximum channel occupancy interval 810, and a data or control channel may be transmitted during a time interval, like an interval 870 of FIG. 8, shorter than a subframe (N, N+1, or N+2) having a general length of 1 ms. The control channel may be understood as a concept including a PDCCH or EPDCCH, or including a newly defined control channel and conventional reference signal, a discovery signal, a newly defined reference signal, a discovery signal, or an initial signal, etc.

The length of the interval 870 may change depending on the length of a second signal transmitted by a base station. For example, in the case where a maximum channel occupiable time interval is 4 ms (for example, the current Japanese regulation), when a second signal 830 is transmitted in two OFDM symbols and then a channel is occupied for subframes N, N+1, and N+2, the base station may occupy a maximum of 12 symbols (in the case of a normal CP) in the interval 870. That is, the sum of the interval 870 and an interval of transmitting the second signal 830 cannot exceed 1 ms. When the LAA terminal cannot previously know the length of the second signal 830 transmitted by the LAA cell, the LAA terminal cannot correctly determine the length of the interval 870. Therefore, when the base station transmits a data channel or a control channel using the unlicensed band within the maximum channel occupiable interval as described above, the LAA cell should notify the LAA terminal of the length of the interval 870 or a subframe structure (or the number of OFDM symbols or configuration information corresponding to the interval). In embodiments of the present disclosure, a subframe, like a subframe N+3 interval 870, different from a general subframe structure (subframe N, N+1, N+2) is expressed by a partial subframe. In addition, in embodiments of the present disclosure, a partial subframe including a signal initially transmitted after a channel detecting operation during the maximum channel occupiable interval of an LAA cell, and a partial subframe including a signal lastly transmitted during the maximum channel occupiable interval of an LAA cell may be configured in different types, respectively. For example, a partial subframe including a signal initially transmitted after a channel detecting operation during the maximum channel occupiable interval of an LAA cell is a partial subframe based on a slot, and a partial subframe including a signal lastly transmitted during the maximum channel occupiable interval of an LAA cell may be configured as a partial subframe based on a special subframe.

As described above, the sum of a partial subframe 870 and an interval of transmitting the second signal 830 does not exceed 1 ms. Therefore, the possible length of a partial subframe 870 of the LAA cell may be configured to be a minimum of 1 and up to a maximum of 14 symbol lengths, in the case of a normal CP. However, in order to configure all the possible partial subframes 870, the position, etc. of a reference signal, such as CRS, DMRS, CSI-RS, etc. should be newly defined, and the newly defined location should be implemented by each of an LAA cell and an LAA terminal. Therefore, a base station and terminal complexity is increased. Therefore, embodiments of the present disclosure propose a scheme of configuring a partial subframe 870 of an LAA cell by utilizing a special subframe structure standardized in the current TDD-based LTE/LTE-A system.

Figure 9:
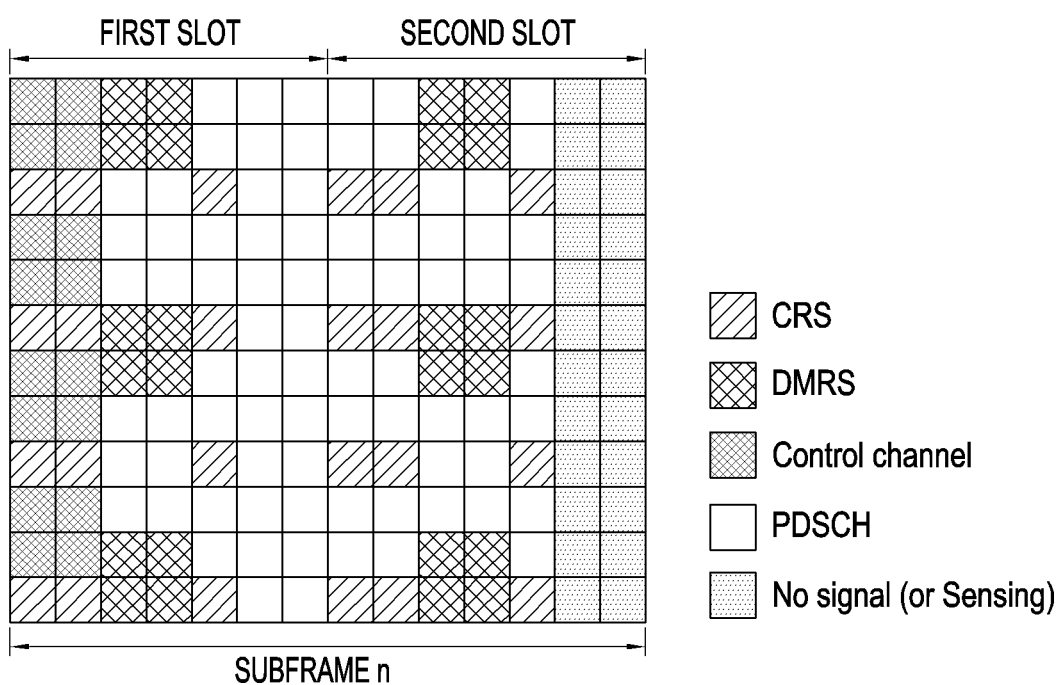
FIG. 9 is a diagram for explaining a method of using a partial subframe in an LAA system according to an embodiment of the present disclosure.

FIG. 9 is a diagram for explaining a method of using a partial subframe in an LAA system according to an embodiment of the present disclosure.

FIG. 9 shows the locations of a CRS and DMRS in a downlink pilot time slot (DwPTS) interval in special subframe configuration 4 among special subframe configurations standardized in the current TDD-based LTE/LTE-A system. A special subframe of the current LTE/LTE-A system does not support CSI-RS transmission. However, in the future LTE-A system (e.g. release 13), CSI-RS may be supported in the special subframe. Therefore, the present disclosure assumes that a partial subframe structure of an LAA cell is configured using a special subframe structure of the LTE/LTE-A system. Therefore, when CSI-RS transmission in the future special subframe is newly introduced, the CSI-RS transmission in the special subframe can be applied to the present disclosure through a modification within a general range.

In a special subframe structure of the current LTE/LTE-A system, the number of OFDM symbols enabling downlink transmission is shown as <Table 5> below. An operation of the present disclosure will be described as follows with reference to FIG. 8 on an assumption that the maximum channel occupiable time interval is 4 ms. In FIG. 8, an LAA cell transmits a second signal during an interval 830 of two OFDM symbols in a subframe N−1 and thus occupies a channel. Therefore, the LAA cell transmits a data channel and control channel using a general subframe structure in subframes N, N+1, and N+2, and occupies the channel during a maximum of 12 symbols in subframe N+3 to transmit a data channel and a control channel. That is, in the above case, the LAA cell may use special subframe configuration 4 as illustrated in FIG. 9 to transmit a downlink signal in the partial subframe 870. When the above embodiment assumes that the LAA cell transmits the second signal during an interval of four OFDM symbols in a subframe N−1, the LAA cell may occupy the channel for a maximum of 8 symbols in a subframe N+3. As shown in <Table 5> below, the configuration in which the number of OFDM symbols enabling downlink transmission is eight does not exist in the special subframe configurations of the current LTE/LTE-A system. Therefore, the LAA cell may select a special subframe configuration (i.e. special subframe configuration 9) having the largest DwPTS interval among special subframe configurations having a number of OFDM symbols smaller than the number of OFDM symbols transmittable in a subframe N+3, and occupy the channel according to the selected special subframe configuration to transmit a data channel and a control channel. In other words, the LAA cell may configure an LAA partial subframe structure using at least one among a time point of transmitting an initial signal through an unlicensed band by occupying the unlicensed band, a maximum channel occupiable interval defined in the unlicensed band, and a partial subframe configuration defined in the system.

The LAA cell may configure an LAA partial subframe using all or some of special subframe configurations defined in the current LTE/LTE-A system. In addition, a configuration in which the number of OFDM symbols enabling downlink transmission is 14 symbols may be included, as one partial subframe configuration, in the special subframe configurations defined in the LTE/LTE-A system. When the LAA cell uses only some of the special subframe configurations defined in the current LTE/LTE-A system, some special subframe structures may be used as a partial subframe configuration with reference to the number of OFDM symbols enabling downlink transmission among the special subframe configurations defined in the above LTE/LTE-A system. For example, as shown in <Table 5> below, the numbers of OFDM symbols enabling downlink transmission of special subframe configurations 1 and 6, 2 and 7, and 3 and 8 are identical to each other, which are 9, 10, and 11, respectively. Therefore, only one may be selected and used from among special subframe configurations 1, 2, and 3 or special subframe configurations 6, 7, and 8. The partial subframe configuration information may be re-constructed using the selected special subframe configuration. Alternatively, LAA partial subframe configuration information may be configured with reference to the number of OFDM symbols enabling downlink transmission among the special subframe configurations defined in the LAA system. <Table 6> below is merely an example, and in <Table 6>, some pieces of configuration information may be excluded or newly added. For example, partial subframe configuration 0 of <Table 6> below has a limited number of three OFDM symbols enabling downlink transmission and thus may be excluded from the LAA partial subframe configuration information. In addition, partial subframe configuration 6 has 14 OFDM symbols enabling downlink transmission, which is identical to that of a general subframe, and thus may be excluded from the partial subframe configuration information. When partial subframe configuration 6 is excluded from Table 2, whether the LAA subframe structure corresponds to a partial subframe or a general subframe having a length of 1 ms may be determined using separate information, and the result therefrom may be transmitted to the LAA terminal. In addition, it is possible to reverse a corresponding field as partial subframe configuration 7, or it is possible to add a new partial subframe configuration including 13 OFDM symbols enabling downlink transmission. <Table 5> below shows an example of a configuration of the number of DL OFDM symbols for respective special subframe configurations.

TABLE 5

| Special subframe Configuration | Number of OFDM symbols for DL |
|---|---|
| 0 | 3 |
| 1 | 9 |
| 2 | 10 |
| 3 | 11 |
| 4 | 12 |
| 5 | 3 |
| 6 | 9 |
| 7 | 10 |

TABLE 5-continued

| Special subframe Configuration | Number of OFDM symbols for DL |
|---|---|
| 8 | 11 |
| 9 | 6 |

Table 6 below shows an example of a configuration of the number of DL OFDM symbols for LAA partial subframe configurations.

TABLE 6

| Partial subframe Configuration | Number of OFDM symbols for DL |
|---|---|
| 0 | 3 |
| 1 | 6 |
| 2 | 9 |
| 3 | 10 |
| 4 | 11 |
| 5 | 12 |
| 6 | 14 |
| 7 | Reserved |

Like the above embodiment of the present disclosure, an LAA cell, which configures an LAA partial subframe configuration using at least one among a time point of transmitting an initial signal through an unlicensed band by occupying the unlicensed band, a maximum channel occupiable interval defined in the unlicensed band, and an LAA partial subframe configuration defined in the LAA system, may transmit control information of the LAA cell, which includes the configured LAA partial subframe configuration information, to an LAA terminal. The LAA cell may transmit, to a plurality of terminals, the control information of the LAA cell, which includes the configured LAA partial subframe configuration information, through a PDCCH of a common search space of a PCell (or PSCell or licensed band cell). The LAA cell may transmit the control information of the LAA cell, which includes the configured LAA partial subframe configuration information, to each of terminals scheduled through a PDCCH or EPDCCH of a UE-specific search space of a PCell (or PSCell or licensed band cell). The above description may include the case where a PCell or PSCell is operated in an unlicensed band. In addition, the LAA cell may transmit the control information of the LAA cell, which includes the configured LAA partial subframe configuration information, through a PDCCH of a common search space of a SCell (or LAA cell or unlicensed band cell), to a plurality of terminals, or may transmit the same information to each of terminals scheduled through a PDCCH or EPDCCH of a UE-specific search space. When the LAA cell transmits the control information of the LAA cell, which includes the configured LAA partial subframe configuration information, through a PDCCH of a common search space of a PCell (or PSCell or licensed band cell) or SCell (or LAA cell or unlicensed band cell), to a plurality of terminals, DCI format 1C may be scrambled into a new terminal identifier (e.g. radio network temporary identifier (RNTI), and the scrambled DCI format 1C may be transmitted. Scrambling information about control information that includes the partial subframe configuration information of the LAA cell and is then transmitted may be configured for a terminal through higher information.

The LAA cell may transfer the configured LAA partial subframe configuration information to a plurality of terminals through a PCFICH channel of a SCell (or LAA cell or unlicensed band cell). Up to 4 pieces of partial subframe configuration information of the LAA cell, which is transmitted through the PCFICH channel, may be selected as shown in <Table 7> below. The partial subframe configuration information of the LAA cell, which is transmitted through the PCFICH channel, may be configured by the number of downlink OFDM symbols that can be transmitted in a partial subframe in the LAA cell, or a part of special subframe configuration information defined in the LTE/LTE-A system. In addition, the number of OFDM symbols through which a control channel is transmitted in a downlink subframe transmitted through the existing PCFICH, or a PDSCH transmission start time point may use information configured through a higher signal. <Table 7> below shows an example of LAA subframe configurations or a configuration of the number of DL OFDM symbols in an LAA subframe.

TABLE 7

| Value | Code word < $b_0, b_1, \ldots, b_{31}$ > | Configuration(or number of OFDM symbol for DL) |
|---|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> | 0(0 or 14symbols) |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> | 9(6 symbols) |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> | 1 or 6(9symbols) |
| 4 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> | 4(12 symbols) |

Like the above embodiment of the present disclosure, an LAA cell, which configures an LAA partial subframe configuration using at least one among a time point of transmitting an initial signal through an unlicensed band by occupying the unlicensed band, a maximum channel occupiable interval defined in the unlicensed band, and an LAA partial subframe configuration defined in the LAA system, may transmit control information of the LAA cell, which includes at least the configured LAA partial subframe configuration information, to an LAA terminal in one or more subframes, for example, by using the following method 1 to method 5.

Method 1: transmitting control information in all subframes of a channel occupancy interval Method 2: transmitting control signal in a first subframe of a channel occupancy interval Method 3: transmitting control information in a last subframe of a channel occupancy interval (transmitting control information in a partial subframe)

Method 4: transmitting control information in a last subframe of a channel occupancy interval (transmitting control information in a subframe immediately before a partial subframe)

Method 5: Transmitting control information in a last subframe and a subframe immediately before the last subframe of a channel occupancy interval (transmitting control information in a partial subframe and a subframe immediately before the partial subframe)

The method 1 will be described in more detail as follows. An LAA cell may transmit control information of the LAA cell, which includes at least partial subframe configuration information of the LAA cell, to an LAA terminal using at least one control channel among PDCCH, EPDCCH, and PCFICH in all subframes including a partial subframe within a channel occupancy interval. The terminal that has received the control information does not know the position of a subframe to which the partial subframe configuration information received from the LAA cell during the channel occupancy interval is actually applied. Therefore, a separate delimiter (identifier) may be included in the control information transmitted by the LAA cell and the control information including the separate delimiter may be transmitted. For example, the LAA cell may transmit, to the LAA terminal, whether a subframe through which the corresponding control information is transmitted corresponds to a partial subframe, by using subframe delimiter information (for example, a signal of 1 bit) of the LAA cell, together with the partial subframe configuration information of the LAA cell. For example, when the received subframe delimiter is 0, the LAA terminal may determine that a subframe through which the subframe delimiter is received corresponds to a general subframe, and when the received subframe delimiter is 1, the LAA terminal may determine that a subframe through which the subframe delimiter is received corresponds to a partial subframe. Information relating to the subframe may be further subdivided using subframe delimiter information having one bit or more. The subframe delimiter notifying whether the LAA subframe corresponds to a partial subframe may be transmitted through a control channel (e.g. PHICH) different from a control channel through which the partial subframe configuration information of the LAA cell is transmitted. For example, when it is determined that the information received through a PHICH channel from the LAA cell is 0, the LAA terminal may determine that a subframe through which the corresponding PHICH is received corresponds to a general subframe, and when it is determined that the received PHICH information is 1, the LAA terminal may determine that a subframe through which the corresponding PHICH is received corresponds to a partial subframe. In this case, the LAA terminal may receive partial subframe configuration information of the LAA cell in every subframe including a partial subframe within the channel occupancy interval from at least one cell and channel among a PDCCH, EPDCCH, and PCFICH of a PCell or SCell according to a control information transmission cell and channel of the LAA cell, and receive subframe delimiter information through an PHICH channel from the LAA cell in every subframe. Then, the LAA terminal may determine whether a subframe through which the control information is received from the LAA cell corresponds to a partial subframe or a general subframe, and may correctly receive a data channel and a control channel in the partial subframe by using the received partial subframe configuration information of the LAA cell. The above description has been explained on an assumption that the LAA terminal receives a subframe delimiter of the LAA cell and partial subframe configuration information of the LAA cell through a PDCCH or EPDCCH of the same cell (PCell or SCell). However, the LAA terminal can also receive the subframe delimiter of the LAA cell and partial subframe configuration information of the LAA cell through a PDCCH or EPDCCH of different cells (PCell or SCell).

The method 2 will be described in more detail as follows. An LAA cell may transmit control information of the LAA cell, which includes at least partial subframe configuration information of the LAA cell, to an LAA terminal using at least one control channel among PDCCH, EPDCCH, and PCFICH in a first subframe (e.g. subframe N of FIG. 8) including a partial subframe within a channel occupancy interval. The terminal that has received the control information does not know the position of a subframe to which the partial subframe configuration information received from the LAA cell during the channel occupancy interval is actually applied. Therefore, a separate delimiter may be included in the control information transmitted by the LAA cell and then be transmitted. For example, the LAA cell may transmit, to the LAA terminal, a time point at which a partial subframe configuration is applied to the corresponding LAA cell, by using subframe delimiter information (for example, a signal of 1 bit) of the LAA cell, together with the partial subframe configuration information of the LAA cell. For example, when the received subframe delimiter is 0, the LAA terminal may determine that a subframe through which the subframe delimiter is received corresponds to a general subframe, and when the received subframe delimiter is 1, the LAA terminal may determine that a subframe through which the subframe delimiter is received corresponds to a partial subframe. Information relating to the subframe may be further subdivided using subframe delimiter information having one bit or more. The subframe delimiter notifying whether the LAA subframe corresponds to a partial subframe may be transmitted through a control channel (e.g. PHICH) different from a control channel through which the partial subframe configuration information of the LAA cell is transmitted. For example, when it is determined that the information received through a PHICH channel from the LAA cell is 0, the LAA terminal may determine that a subframe through which the corresponding PHICH is received corresponds to a general subframe, and when it is determined that the received PHICH information is 1, the LAA terminal may determine that a subframe through which the corresponding PHICH is received corresponds to a partial subframe. In this case, the LAA terminal may receive partial subframe configuration information of the LAA cell in a first subframe including a partial subframe within the channel occupancy interval of the LAA cell from at least one cell and channel among a PDCCH, EPDCCH, and PCFICH of a PCell or SCell according to a control information transmission cell and channel of the LAA cell, and receive subframe delimiter information through an PHICH channel from the LAA cell in every subframe. Then, the LAA terminal may determine whether a subframe through which the subframe delimiter information is received from the LAA cell corresponds to a partial subframe or a general subframe, and may correctly receive a data channel and a control channel in the partial subframe by using the pre-received partial subframe configuration information of the LAA cell. The LAA terminal may receive the subframe delimiter of the LAA cell and partial subframe configuration information of the LAA cell through a PDCCH or EPDCCH of the same PCell or SCell. The above description has been explained on an assumption that the LAA terminal receives a subframe delimiter of the LAA cell and partial subframe configuration information of the LAA cell through a PDCCH or EPDCCH of the same cell (PCell or SCell). However, the LAA terminal can also receive the subframe delimiter of the LAA cell and partial subframe configuration information of the LAA cell through a PDCCH or EPDCCH of different cells (PCell or SCell).

The method 3 will be described in more detail as follows. An LAA cell may transmit control information of the LAA cell, which includes at least partial subframe configuration information of the LAA cell, to an LAA terminal using at least one control channel among PDCCH, EPDCCH, and PCFICH in a subframe (e.g. subframe N+3 of FIG. 8) to which a partial subframe is actually applied within a channel occupancy interval. A terminal that receives the information may identify the position of a subframe to which a partial subframe configured by the LAA cell during the channel occupancy interval is actually applied, that is, a partial subframe position of the LAA cell, by using the partial subframe configuration information of the LAA cell or whether the partial subframe configuration information is included. For example, the LAA terminal that has received the control information of the LAA cell, which includes the partial subframe configuration information of the LAA cell, may determine, as a partial subframe, a subframe that has received the control information, and correctly receive a data channel and a control channel in the partial subframe according to a partial subframe configuration of the LAA cell, which is configured in the control information.

The method 4 will be described in more detail as follows. An LAA cell may transmit control information of the LAA cell, which includes at least partial subframe configuration information of the LAA cell, to an LAA terminal using at least one control channel among PDCCH, EPDCCH, and PCFICH in a subframe (e.g. subframe N+2 of FIG. 8) immediately before a subframe to which a partial subframe is actually applied within a channel occupancy interval. A terminal that receives the information may identify the position of a subframe to which a partial subframe configured by the LAA cell during the channel occupancy interval is actually applied, that is, a partial subframe position of the LAA cell, by using the partial subframe configuration information of the LAA cell or whether the partial subframe configuration information is included. For example, the LAA terminal that has received the control information of the LAA cell, which includes the partial subframe configuration information of the LAA cell, may determine, as a partial subframe, a subframe immediately after a subframe through which the control information is received, and correctly receive a data channel and a control channel in the partial subframe according to a partial subframe configuration of the LAA cell, which is configured in the control information.

The method 5 will be described in more detail as follows. An LAA cell may transmit control information of the LAA cell, which includes at least partial subframe configuration information of the LAA cell, to an LAA terminal using at least one control channel among PDCCH, EPDCCH, and PCFICH in a subframe immediately before a subframe to which a partial subframe is actually applied within a channel occupancy interval and the subframe to which the partial subframe is actually applied (e.g. subframe N+2 and N+3 of FIG. 8). The terminal that has received the control information does not know the position of a subframe to which the partial subframe configuration information received from the LAA cell during the channel occupancy interval is actually applied. Therefore, a separate delimiter may be included in the control information transmitted by the LAA cell and then be transmitted. For example, the LAA cell may transmit, to the LAA terminal, whether a subframe through which the corresponding control information is transmitted corresponds to a partial subframe, by using subframe delimiter information (for example, a signal of 1 bit) of the LAA cell, together with the partial subframe configuration information of the LAA cell. For example, when the received subframe delimiter is 0, the LAA terminal may determine that a subframe through which the subframe delimiter is received corresponds to a general subframe, and when the received subframe delimiter is 1, the LAA terminal may determine that a subframe through which the subframe delimiter is received corresponds to a partial subframe. Information relating to the subframe may be further subdivided using subframe delimiter information having one bit or more (for example, information relating to the number of symbols, as shown in <Table 5> and <Table 6>). A subframe delimiter notifying whether the LAA subframe corresponds to a partial subframe may be transmitted through a control channel (for example, PHICH) different from a control channel through which partial subframe configuration information of the LAA cell is transmitted. For example, when it is determined that the information received through a PHICH channel from the LAA cell is 0, the LAA terminal may determine that a subframe through which the corresponding PHICH is received corresponds to a general subframe, and when it is determined that the received PHICH information is 1, the LAA terminal may determine that a subframe through which the corresponding PHICH is received corresponds to a partial subframe. In this case, the LAA terminal may receive partial subframe configuration information of the LAA cell in every subframe including a partial subframe during the channel occupancy interval from at least one cell and channel among a PDCCH, EPDCCH, and PCFICH of a PCell or SCell according to a control information transmission cell and channel of the LAA cell, and receive subframe delimiter information through an PHICH channel from the LAA cell in every subframe. Then, the LAA terminal may determine whether a subframe through which the control signal is received from the LAA cell corresponds to a partial subframe or a general subframe, and may correctly receive a data channel and a control channel in the partial subframe by using the received partial subframe configuration information of the LAA cell. The above description has been explained on an assumption that the LAA terminal receives a subframe delimiter of the LAA cell and partial subframe configuration information of the LAA cell through a PDCCH or EPDCCH of the same cell (PCell or SCell). However, the LAA terminal can also receive the subframe delimiter of the LAA cell and partial subframe configuration information of the LAA cell through a PDCCH or EPDCCH of different cells (PCell or SCell).

Figure 10:
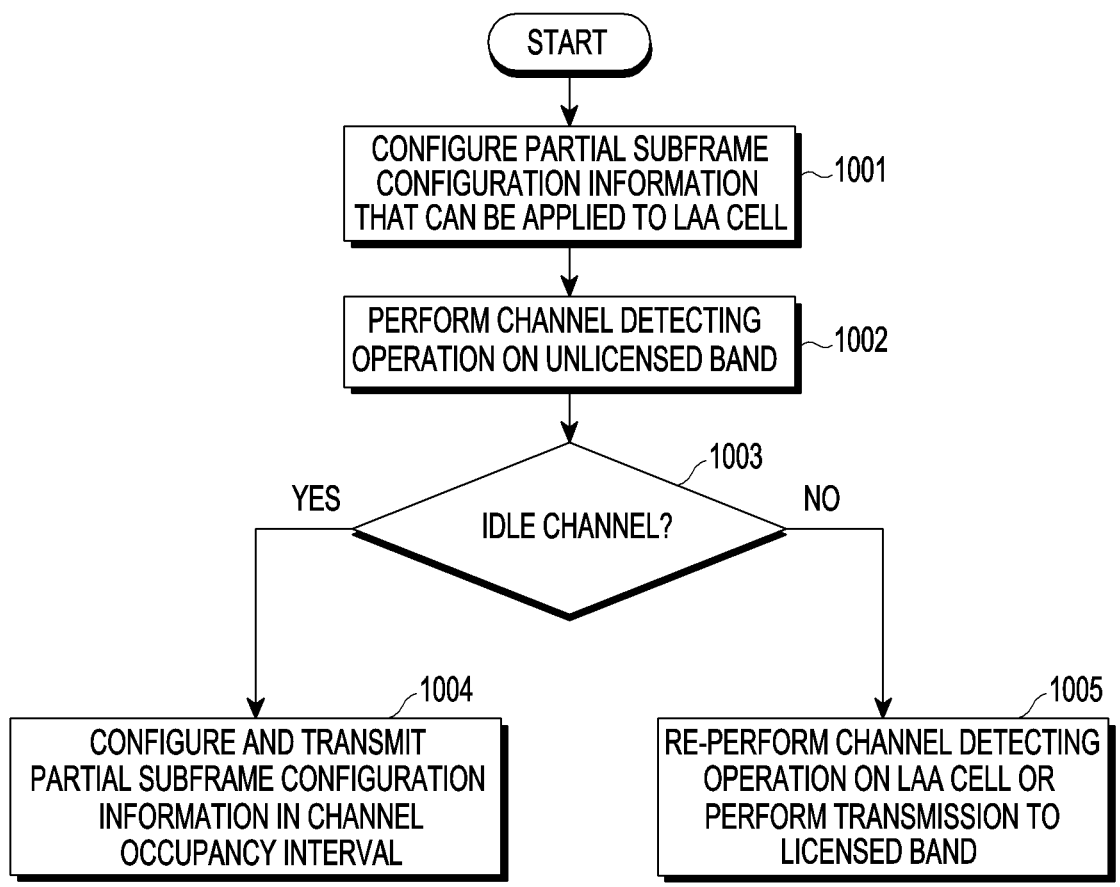
FIG. 10 is a flowchart illustrating a method by which a base station transmits information relating to a configuration of a partial subframe of an LAA cell according to an embodiment of the present disclosure.

FIG. 10 is a flowchart illustrating a method by which a base station transmits information relating to a configuration of a partial subframe of an LAA cell according to an embodiment of the present disclosure.

Referring to FIG. 10, a base station configures variables relating to a partial subframe configuration that is applicable during a channel occupancy interval, in operation 1001. The variables may be previously defined between the base station and a terminal, configured for a terminal through higher (layer) information by the base station, or configured through control information transmitted through an unlicensed band. The base station may configure variables relating to a channel detecting interval for performing a channel detecting operation. The variables may be configured on the basis of the regulations (e.g. ETSI BRAN, EN301 893) defined for frequency bands or countries in which the LAA system is used. At least one among the variables may be configured to be different from a variable applied to a previous channel detecting operation, previously defined between the base station and a terminal, configured for a terminal through higher (layer) information by the base station, or differently configured depending on a transmission/reception result of data transmitted through an unlicensed band.

The base station performs a channel detecting operation on an unlicensed band on the basis of the configured variables, in operation 1002. Then, the base station determines whether a sensed channel is in an idle state through a result obtained by performing the channel detecting operation on the unlicensed band, in operation 1003. When the sensed channel is in an idle state, the base station occupies the channel and configures a partial subframe configuration applied to the channel occupancy interval, and transmits the partial subframe configuration information applied to the channel occupancy interval to a terminal, in operation 1004. A method of configuring the configured partial subframe configuration and transmitting information relating the configured partial subframe configuration (e.g. the above described methods 1 to 5) has been explained in the above embodiments, and thus a specific explanation thereof will be omitted. When the sensed channel is not in an idle state in operation 1003 and a transmission is to be performed, the base station re-performs the channel detecting operation on the unlicensed band or performs the transmission through a licensed band, in operation 1005.

Figure 11:
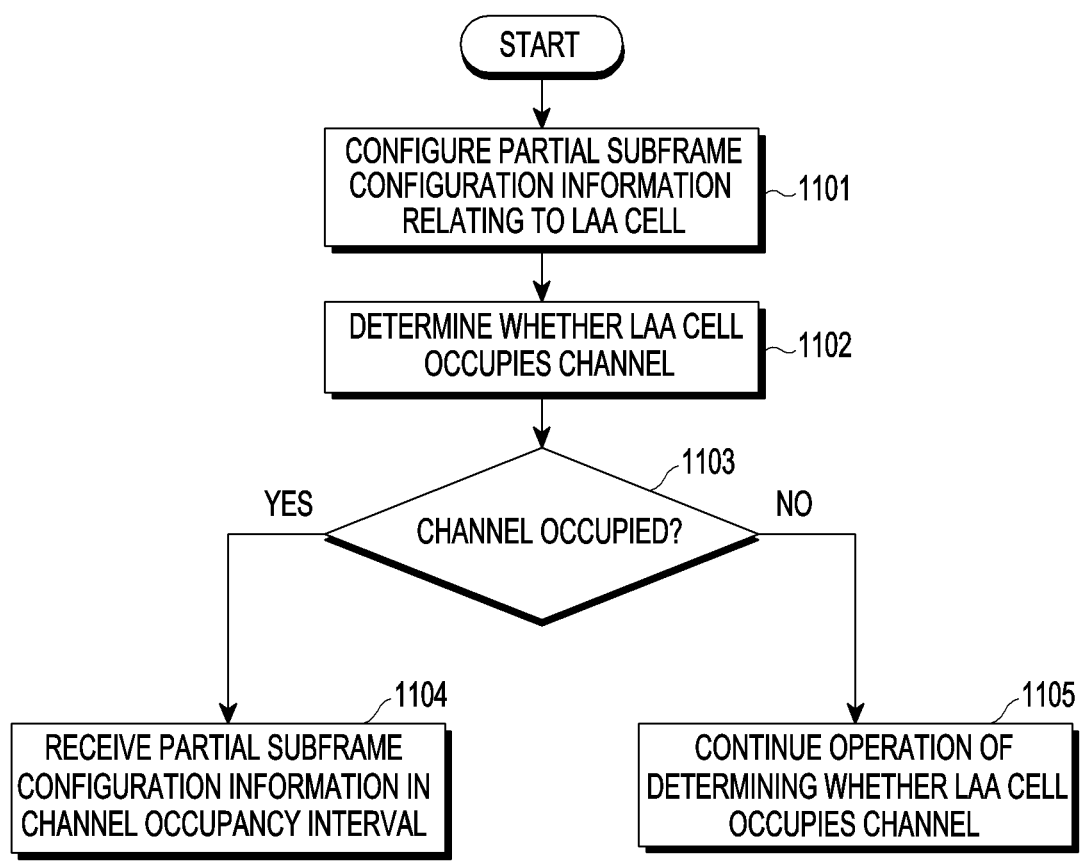
FIG. 11 is a flowchart illustrating a method by which a terminal receives information relating to a configuration of a partial subframe of an LAA cell according to an embodiment of the present disclosure.

FIG. 11 is a flowchart illustrating a method by which a terminal receives information relating to a configuration of a partial subframe of an LAA cell according to an embodiment of the present disclosure.

Referring to FIG. 11, a terminal receives, from a base station, variables relating to partial subframe configuration information which can be configured by the base station and/or a channel detecting interval for performing a channel detecting operation, in operation 1101. The variable may be defined previously between the base station and the terminal. The terminal determines whether the base station occupies a channel in an unlicensed band, in operation 1102. In one example of a method for determining, by the terminal, whether the base station occupies a channel, the terminal may determine whether the base station occupies a channel, by blind-detecting a reference signal (CRS) of the base station. For example, the terminal may detect a CRS signal located in a first symbol in every symbol, and may determine whether the base station occupies a channel, depending on a result obtained from the detection. When the terminal determines that the base station has occupied an unlicensed band in operation 1103, the terminal may receive control information including partial subframe configuration information configured during the channel occupancy interval by the base station, to correctly receive a data channel and control channel in a partial subframe during the channel occupancy interval, in operation 1104. The method (e.g. the described methods 1 to 5) for receiving, by the terminal, partial subframe configuration information configured during (applied to) the channel occupancy interval has been explained in the above embodiments, and thus a specific description thereof will be omitted. When the channel has not been occupied by the base station, in operation 1103, the terminal may re-perform an operation determining whether the channel is occupied in the unlicensed band, in operation 1105.

In relation to FIGS. 10 and 11, a method for performing, by a base station and a terminal, an operation of configuring a partial subframe configuration during a channel occupancy interval and transmitting and receiving information relating to the configuration has been described. Next, an operation of transmitting and receiving information relating to the configuration of partial subframe configuration in a wireless communication system according to an embodiment of the present disclosure will be described with reference to FIGS. 12 and 13 in relation to a configuration of the base station and terminal.

Figure 12:
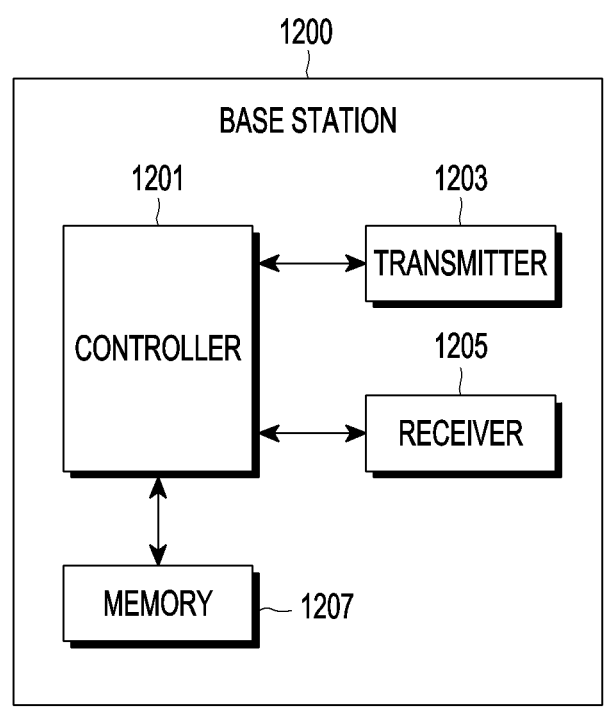
FIG. 12 is a diagram illustrating one example of a configuration of a base station device according to an embodiment of the present disclosure.

FIG. 12 is a diagram illustrating an example of a configuration of a base station device according to an embodiment of the present disclosure. Referring to FIG. 12, the base station 1200 may include a controller 1201, a transmitter 1203, a receiver 1205, and a memory 1207.

The controller 1201 controls overall operations of the base station 1200, and specifically controls an operation of configuring partial subframe configuration and transmitting the configuration according to at least one among the above embodiments of the present disclosure. An operation relating to the operation of configuring partial subframe configuration according to the embodiment of the present disclosure is the same as that in the description explained with reference to FIGS. 5A to 11. Therefore, a specific description of the operation will be omitted.

The transmitter 1203 may transmit various types of control information and various messages to other entities included in a wireless communication system depending on the control of the controller 1201. The various types of control information and various messages transmitted by the transmitter 1203 are the same as those described with reference to FIGS. 5A to 11. Therefore, a specific description thereof will be omitted.

The receiver 1205 may receive data, various types of control information, and various messages from other entities included in a wireless communication system depending on the control of the controller 1201. The various types of control information and various messages received by the receiver 1205 are the same as those described with reference to FIGS. 5A to 11. Therefore, a specific description thereof will be omitted.

The memory (or storage unit) 1207 may store a program and various types of data for performing an operation relating to the operation of configuring a partial subframe configuration and transmitting the configuration according to an embodiment of the present disclosure, which is performed by the base station 1200 according to the control of the controller 1201. The memory 1207 may store various types of control information and various messages received from other entities by the receiver 1205.

FIG. 12 illustrates the case where the base station 1200 is implemented by separate units, such as the controller 1201, the transmitter 1203, the receiver 1205, and the memory 1207. However, the base station 1200 may be implemented by the integration of at least two among the controller 1201, the transmitter 1203, the receiver 1205, and the memory 1207. The base station 1200 may include at least one processor and transmitter/receiver configured to control at least one operation described in the embodiments of the present disclosure.

Figure 13:
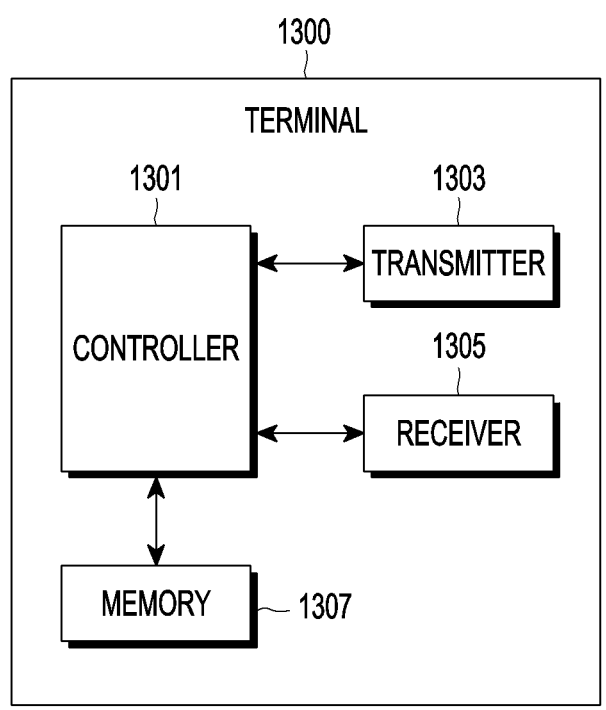
FIG. 13 is a diagram illustrating one example of a configuration of a terminal device according to an embodiment of the present disclosure.

FIG. 13 is a diagram illustrating an example of a configuration of a terminal device according to an embodiment of the present disclosure.

Referring to FIG. 13, a terminal 1300 may include a controller 1301, a transmitter 1303, a receiver 1305, and a memory 1307.

The controller 1301 controls overall operations of the terminal 1300, and specifically controls an operation relating to the reception (or configuration) of partial subframe configuration information configured by the base station (or previously defined) according to at least one among the above embodiments of the present disclosure and the received partial subframe configuration. A control operation according to the reception (or configuration) of partial subframe configuration information configured by the base station (or previously defined) according to at least one among the above embodiments of the present disclosure and the received partial subframe configuration is the same as that in the description explained with reference to FIGS. 5A to 11. Therefore, a specific description of the operation will be omitted.

The transmitter 1303 may transmit various types of control information and various messages to other entities included in a wireless communication system depending on the control of the controller 1301. The various types of control information and various messages transmitted by the transmitter 1303 are the same as those described with reference to FIGS. 5A to 11. Therefore, a specific description thereof will be omitted.

The receiver 1305 may receive data, various types of control information, and various messages from other entities included in a wireless communication system depending on the control of the controller 1301. The various types of control information and various messages received by the receiver 1305 are the same as those described with reference to FIGS. 5A to 11. Therefore, a specific description thereof will be omitted.

The memory 1307 may store a program and various types of data, etc. for performing an operation relating to the reception of partial subframe configuration information configured by the base station and the received partial subframe configuration according to an embodiment of the present disclosure, which is performed by the terminal 1300 according to the control of the controller 1301. The memory 1307 may store various types of control information and various messages received from other entities by the receiver 1305.

FIG. 13 illustrates the case where the terminal 1300 is implemented by separate units, such as the controller 1301, the transmitter 1303, the receiver 1305, and the memory 1307. However, the terminal 1300 may be implemented by the integration of at least two among the controller 1301, the transmitter 1303, the receiver 1305, and the memory 1307. The terminal 1300 may include at least one processor and transmitter/receiver configured to control at least one operation described in the embodiments of the present disclosure.

Meanwhile, although the concrete embodiments have been described in the detailed description of the present disclosure, various modifications can be made without departing from the scope of the present disclosure. Therefore, the scope of the present disclosure should not be defined as being limited to the aforementioned embodiments, but should be defined by the appended claims and equivalents thereof.

The invention claimed is:

1. A method for transmitting, by a terminal, uplink control information (UCI) including acknowledgment information in a wireless communication system supporting carrier aggregation, the method comprising:
receiving, from a base station, downlink control information including indication information of a resource for transmitting the acknowledgment information;
determining a resource of an uplink control channel in which the UCI including the acknowledgment information and channel information is to be transmitted based on a number of bits of the UCI and the indication information; and
transmitting the UCI including the acknowledgment information and the channel information in the uplink control channel based on the determined resource,
wherein the determining of the resource of the uplink control channel includes:
determining a first set of physical uplink control channel (PUCCH) resources in case that the number of bits of the UCI is greater than 2 and not greater than a first predetermined number and determining a first PUCCH resource from the first set of PUCCH resources based on the indication information,
determining a second set of PUCCH resources in case that the number of bits of the UCI is greater than the first predetermined number and not greater than a second predetermined number and determining a second PUCCH resource from the second set of PUCCH resources based on the indication information, and
determining a third set of PUCCH resources in case that the number of bits of the UCI is greater than the second predetermined number and not greater than a third predetermined number and determining a third PUCCH resource from the third set of PUCCH resources based on the indication information, and
wherein the first predetermined number, the second predetermined number and the third predetermined number are different from each other.

2. The method of claim 1, wherein the acknowledgment information relates to downlink data received from a plurality of cells configured by the carrier aggregation.

3. The method of claim 1, further comprising:
comparing a sum of a number of bits of the acknowledgment information and a number of bits of the channel information with a payload size configured by higher layer information; and
selectively transmitting the channel information based on a result obtained from the comparing.

4. The method of claim 1, further comprising:
comparing a sum of a number of bits of the acknowledgment information and a number of bits of the channel information with a payload size configured by higher layer information; and
determining whether to apply spatial bundling to the acknowledgment information, based on a result obtained from the comparing.

5. The method of claim 1, further comprising:
comparing a sum of a number of bits of the acknowledgment information and a number of bits of the channel information with a payload size configured by higher layer information; and
transmitting the channel information within the payload size according to a determined priority, based on a result obtained from the comparing.

6. A terminal in a wireless communication system supporting carrier aggregation, the terminal comprising:
a transceiver configured to transmit or receive data; and
a processor configured to:
control the transceiver to receive, from a base station via the transceiver, downlink control information including indication information of a resource for transmitting acknowledgment information,
determine a resource of an uplink control channel in which uplink control information (UCI) including the acknowledgment information and channel information is to be transmitted based on a number of bits of the UCI and the indication information, and
control the transceiver to transmit the UCI including the acknowledgment information and the channel information in the uplink control channel based on the determined resource,
wherein the processor is further configured to:
determine a first set of physical uplink control channel (PUCCH) resources in case that the number of bits of the UCI is greater than 2 and not greater than a first predetermined number and determine a first PUCCH resource from the first set of PUCCH resources based on the indication information, determine a second set of PUCCH resources in case that the number of bits of the UCI is greater than the first predetermined number and not greater than a second predetermined number and determine a second PUCCH resource from the second set of PUCCH resources based on the indication information, and determine a third set of PUCCH resources in case that the number of bits of the UCI is greater than the second predetermined number and not greater than a third predetermined number and determine a third PUCCH resource from the third set of PUCCH resources based on the indication information, and wherein the first predetermined number, the second predetermined number and the third predetermined number are different from each other.

7. The terminal of claim 6, wherein the acknowledgment information relates to downlink data received from a plurality of cells configured by the carrier aggregation.

8. The terminal of claim 6,
wherein the processor is further configured to:
compare a sum of a number of bits of the acknowledgment information and a number of bits of the channel information with a payload size configured by higher layer information, and
selectively transmit the channel information based on a result obtained from the comparing.

9. The terminal of claim 6,
wherein the processor is further configured to:
compare a sum of a number of bits of the acknowledgment information and a number of bits of the channel information with a payload size configured by higher layer information, and
determine whether to apply spatial bundling to the acknowledgment information, based on a result obtained from the comparing.

10. The terminal of claim 6,
wherein the processor is further configured to:
compare a sum of a number of bits of the acknowledgment information and a number of bits of the channel information with a payload size configured by higher layer information, and
transmit the channel information within the payload size according to a determined priority, based on a result obtained from the comparing.

11. A terminal in a wireless communication system supporting carrier aggregation, the terminal comprising:
a transceiver configured to transmit or receive data; and
a processor configured to:
control the transceiver to receive, from a base station via the transceiver, downlink control information including indication information of a resource for transmitting acknowledgment information, determine a resource of an uplink control channel in which uplink control information (UCI) including the acknowledgment information and channel information is to be transmitted based on a number of bits of the UCI and the indication information, control the transceiver to transmit the UCI including the acknowledgment information and the channel information in the uplink control channel in case that the terminal is configured to transmit the acknowledgment information and the channel information simultaneously by higher layer information, and control the transceiver to transmit the acknowledgment information without the channel information in the uplink control channel in case that the terminal is not configured to transmit the acknowledgment information and the channel information simultaneously, wherein the processor is further configured to:
determine a first set of physical uplink control channel (PUCCH) resources in case that the number of bits of the UCI is greater than 2 and not greater than a first predetermined number and determine a first PUCCH resource from the first set of PUCCH resources based on the indication information, determine a second set of PUCCH resources in case that the number of bits of the UCI is greater than the first predetermined number and not greater than a second predetermined number and determine a second PUCCH resource from the second set of PUCCH resources based on the indication information, and determine a third set of PUCCH resources in case that the number of bits of the UCI is greater than the second predetermined number and not greater than a third predetermined number and determine a third PUCCH resource from the third set of PUCCH resources based on the indication information, and wherein the first predetermined number, the second predetermined number and the third predetermined number are different from each other.

* * * * *